(12) United States Patent
Pinto et al.

(10) Patent No.: US 8,301,822 B2
(45) Date of Patent: Oct. 30, 2012

(54) MULTI-PROTOCOL STORAGE DEVICE BRIDGE

(75) Inventors: Yosi Pinto, Kfar-Vradim (IL); Yacov Duzly, Ra-Anana (IL); Amir Fridman, Tel Aviv (IL); Eyal Hakoun, Kibbutz Matzuba (IL)

(73) Assignee: Sandisk IL Ltd., Kfar Saba (IL)

( * ) Notice: Subject to any disclaimer, the term of this patent is extended or adjusted under 35 U.S.C. 154(b) by 515 days.

(21) Appl. No.: 12/565,685

(22) Filed: Sep. 23, 2009

(65) Prior Publication Data
US 2011/0072185 A1 Mar. 24, 2011

(51) Int. Cl.
*G06F 13/36* (2006.01)

(52) U.S. Cl. ......... 710/315; 710/305; 710/311; 710/313

(58) Field of Classification Search .................. 713/340; 710/65, 301, 305, 36, 311, 313, 315; 714/43, 714/44
See application file for complete search history.

(56) References Cited

U.S. PATENT DOCUMENTS

| | | | |
|---|---|---|---|
| 5,151,898 A | | 9/1992 | Kondo |
| 5,832,244 A * | 11/1998 | Jolley et al. ................ 710/305 |
| 5,928,347 A * | 7/1999 | Jones ........................... 710/305 |
| 6,038,618 A * | 3/2000 | Beer et al. ..................... 710/18 |
| 6,088,755 A * | 7/2000 | Kobayashi et al. ........... 710/300 |
| 6,145,046 A * | 11/2000 | Jones ........................... 710/301 |
| 6,334,160 B1 * | 12/2001 | Emmert et al. ................ 710/11 |
| 6,502,159 B1 | 12/2002 | Chuang et al. |
| 6,718,274 B2 * | 4/2004 | Huang et al. .................. 702/64 |
| 6,832,281 B2 * | 12/2004 | Jones et al. .................. 710/301 |
| 6,839,864 B2 * | 1/2005 | Mambakkam et al. ...... 714/5.11 |
| 6,880,024 B2 * | 4/2005 | Chen et al. .................... 710/62 |
| 6,895,447 B2 * | 5/2005 | Brewer et al. ................. 710/11 |
| 7,047,450 B2 * | 5/2006 | Iwamitsu et al. .............. 714/43 |

(Continued)

FOREIGN PATENT DOCUMENTS

DE 102006059109 A1 6/2008

(Continued)

OTHER PUBLICATIONS

McLean, Peter. Information Technology—AT Attachment with Packet Interface—6. Working Draft. Feb. 26, 2002.*

(Continued)

*Primary Examiner* — Matthew D Spittle
(74) *Attorney, Agent, or Firm* — Toler Law Group, PC

(57) ABSTRACT

A bridge includes a host interface via which data/commands are received from and transferred to a host, and a storage device interface via which data/commands are received from and transferred to a storage device. The bridge also includes one SDPC, a controller and a switching system that is configurable by the controller to connect the protocol converter to the host interface and the storage device interface if the storage device protocol used by the host device differs from the storage device protocol used by the storage device, and to connect the host device interface to the storage device interface, not via the bi-directional protocol converter, if the two storage device protocols are the same. The bridge may include two SDPCs, each for converting a different protocol to the host protocol and vice versa, with the switching system being configurable to switch between the two SDPCs. The bridge may omit the SDPC altogether, with the switching system being configurable to switch between connecting (1) the host device interface to the storage device interface, and (2) bypassing the storage device interface.

34 Claims, 18 Drawing Sheets

U.S. PATENT DOCUMENTS

| | | |
|---|---|---|
| 7,069,369 B2 * | 6/2006 | Chou et al. .................. 710/301 |
| 7,076,580 B2 * | 7/2006 | Nakano ........................ 710/65 |
| 7,120,713 B2 | 10/2006 | Kinstler |
| 7,162,549 B2 * | 1/2007 | Mambakkam et al. ......... 710/16 |
| 7,222,205 B2 * | 5/2007 | Jones et al. .................. 710/301 |
| 7,237,049 B2 * | 6/2007 | Kang et al. ................... 710/104 |
| 7,254,650 B2 * | 8/2007 | Lin et al. ..................... 710/11 |
| 7,263,476 B1 * | 8/2007 | Dellacona .................... 703/13 |
| 7,278,051 B2 * | 10/2007 | Mambakkam et al. ...... 714/6.12 |
| 7,376,773 B2 * | 5/2008 | Kim et al. .................... 710/74 |
| 7,412,628 B2 * | 8/2008 | Shikada ....................... 714/43 |
| 7,624,216 B2 * | 11/2009 | Yoshikawa et al. ........... 710/301 |
| 7,664,902 B1 * | 2/2010 | Chow et al. .................. 710/301 |
| 7,827,337 B2 * | 11/2010 | Jeong .......................... 710/113 |
| 7,848,160 B2 * | 12/2010 | Kuriyama ................. 365/189.15 |
| 7,925,812 B2 * | 4/2011 | Konno et al. ................ 710/301 |
| 2003/0066087 A1 | 4/2003 | Sawyer et al. |
| 2004/0027879 A1 * | 2/2004 | Chang .......................... 365/200 |
| 2004/0070952 A1 * | 4/2004 | Higuchi et al. ............... 361/737 |
| 2005/0097263 A1 * | 5/2005 | Wurzburg .................... 711/103 |
| 2006/0161716 A1 * | 7/2006 | Lin .............................. 710/313 |
| 2009/0270117 A1 * | 10/2009 | Buckley ....................... 455/515 |

FOREIGN PATENT DOCUMENTS

| | | |
|---|---|---|
| WO | 2006101057 A1 | 9/2006 |

OTHER PUBLICATIONS

Compaq et al. Universal Serial Bus Specification. Revision 2.0. Apr. 27, 2000.*

Venkatesan, Vandana. Mobile Storage: Trends for Tomorrow. The Advent of UFS (Universal Flash Storage). Aug. 2011.*

JEDEC. Universal Flash Storage (UFS 1.1). JESD220A. Jun. 2012.*

Vuong, Hung. Flash Storage Trends & Ecosystem. Qualcomm Inc. 2010.*

JEDEC. Universal Flash Storage (UFS) Host Controller Interface. JESD223. Aug. 2011.*

International Search Report and Written Opinion issued in International Application No. PCT/IB2010/002191 dated Feb. 7, 2011, 12 pages.

* cited by examiner

MULTI-PROTOCOL STORAGE DEVICE BRIDGE

FIELD OF THE INVENTION

The present invention generally relates to storage systems and more specifically to a method for connecting a host device to a storage device using a communication protocol the same as or different from the communication protocol the host device is using, and to an apparatus that enables the connection method.

BACKGROUND

Use of flash storage devices has been rapidly increasing over the years because they are portable and they have small physical size and large storage capacity. Flash storage devices come in a variety of designs. Some storage devices are regarded as "removable", which means that a user can move them from one host device (e.g., cellular phone) to another or use multiple storage devices with one host device by swapping storage devices engaged by such host device. Other storage devices are regarded as "embedded", meaning that they are built into and not intended to be removed by the user from the host device.

A host may need to operate with various kinds of removable storage devices, be it presently existing or future storage devices (e.g., SD cards, UFS cards, UHS-II cards, etc.). Various storage devices use or may be designed to use different kinds of protocols. To this end, the host device would have to accommodate different protocols, and this has typically required separate interfaces for the different cards and protocols. Also, the host may have to accommodate different storage device communication topologies.

Providing a host with large number of interfaces that support different protocols and topologies for communicating with various storage devices is not always practical and effective. Hence, there is a need to address this problem with a better approach.

SUMMARY

In view of the foregoing, it would be beneficial to have, for example, a host device that can communicate with storage devices of various types via a single, common interface. Among the various storage devices there are 'slower' cards, such as legacy SD cards, and 'faster' cards, such as UHS-II cards or UFS cards, and accommodating all of them with a single, common interface is advantageous. To carry out the communications in different protocols, the single, common interface is adapted as a versatile interface (which is referred to hereinafter as a "bridge"). Various embodiments of a bridge designed to accommodate such communications are provided herein.

In one implementation, a bridge is placed along a serial communication path so as to interface, communication-wise, between a host device and a removable storage device. The bridge includes two interfaces for conveying data and commands between the host device and storage device. One of the two interfaces is on the host side, a host interface, and the other is on the storage device side, a storage device interface.

The bridge may include one or more bi-directional storage device protocol converters ("SDPCs"). An SDPC may be adapted to use a storage device protocol that the host device uses to convert and transfer data and commands to the host device through the host interface. Such SDPC is further adapted to use a storage device protocol that the storage device uses to convert and transfer data and commands to the storage device through the storage device interface. The bridge also includes a controller and a switching system. The switching system may be configurable by the controller to be in one of a number of states. For example, in state (1), the switching system connects the host interface to the storage device interface via an SDPC if the storage device protocol used by the host device and the storage device protocol used by a storage device engaged by the host are different, in state (2), the switching system connects the host device interface to the storage device interface directly or through other means, bypassing the SDPC, if the two storage device protocols are the same, and in state (3), the switching system bypasses the storage device interface if the storage device is not connected to the bridge.

Not all of the three switch states described above are necessarily implemented in or used by a bridge. The number and types of switch states that a bridge uses may depend on the circumstances (e.g., type of required conversion(s), type of used network topology, etc.). For example, state (1) and state (2) referred to above are applicable, for example, if the host device and the storage device are functionally connected via a chain topology. In another example, state (1) and state (3) referred to above are applicable, for example, if the host device and the storage device are functionally connected via a ring topology and no protocol conversion is involved, and all of the states mentioned above are applicable for a ring topology system where protocol conversion is required. By manipulating the switching system, devices that use a low speed storage device protocol and devices that use a high speed storage device protocol can both communicate with a host device through the bridge using a single, common high speed storage device protocol.

Alternatively, the bridge may include two SDPCs, each for converting a different protocol to the host protocol and vice versa, with the switching system being configurable by the controller to switch merely between the two SDPCs. Then again, the bridge may omit the SDPC altogether, with the switching system being configurable by the controller to switch merely between connecting (1) the host device interface to the storage device interface, and (2) bypassing the storage device interface. In another implementation, the bridge may be connected directly to the host device or to a communication hub. These and other, embodiments, features, aspects and advantages thereof will become better understood from the description herein, appended claims, and accompanying drawings as hereafter described.

BRIEF DESCRIPTION OF THE DRAWINGS

The accompanying drawings, which are incorporated in and constitute part of this specification, illustrate various embodiments with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures.

DETAILED DESCRIPTION

Figure 1:
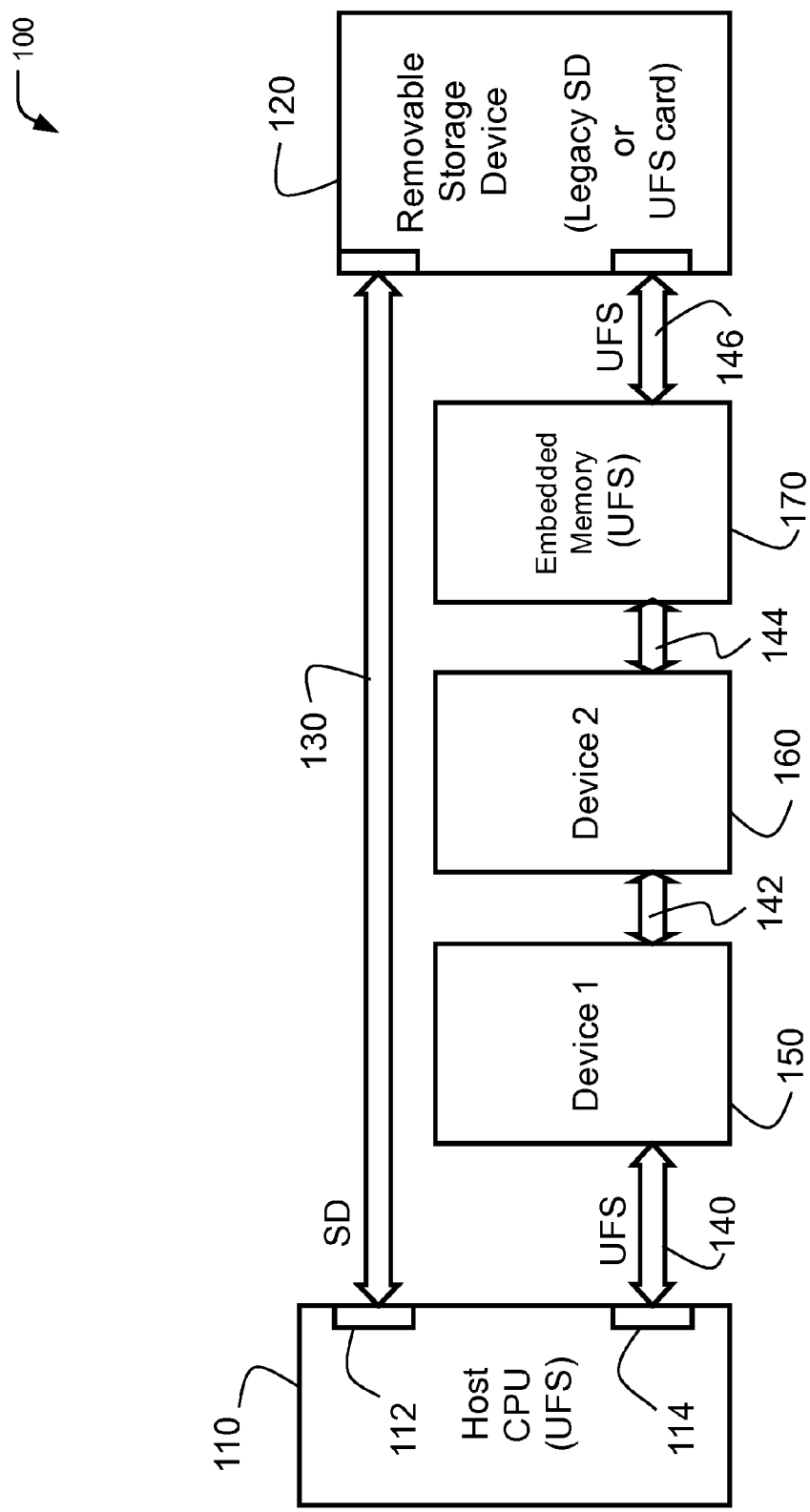
FIG. 1 is a diagram of an example conventional network architecture in which a host device communicates with a faster storage device (e.g., UFS card) or a slower storage device (e.g., legacy SD card) using chain topology.

The description that follows provides various details of example embodiments. However, this description is not intended to limit the scope of the claims but instead to explain various principles of the invention and the manner of practicing it.

Universal Flash Storage (UFS) is a proposed common flash storage specification for digital cameras, mobile phones and consumer electronic devices. UFS is designed to provide higher data transfer speed and increased reliability in flash memory storage. Ultra-High-Speed type II (UHS-II) is a new specification that defines a new generation of SD cards. UFS and UHS-II protocols are also referred to herein as "high speed protocols". A current generation (i.e., non-UHS-II) SD card/protocol is referred to herein as a "legacy SD card/protocol" or "low speed card/protocol".

Secure digital ("SD") memory cards and embedded multimedia-card ("eMMC") storage devices are examples of relatively slow flash storage devices. Examples of faster flash storage devices include ultra high speed type II ("UHS-II") memory cards and universal flash storage ("UFS") storage devices. "UFS" is a standard developed by UFS task force working for the Joint Electron Device Engineering Council(s) ("JEDEC") Solid State Technology Association, and "UHS-II" is a standard developed by the SD Association ("SDA") for the next generation of SD storage device. Host devices communicate with SD cards by using an SD protocol that facilitates relatively slow data communication. Host devices are designed to communicate with UFS cards and UHS-II cards by using a UFS protocol and a UHS-II protocol, respectively, that facilitates faster data communication. The UHS-II and UFS protocols are defined for significantly higher data transfer rates than the legacy SD protocol. In order to support such high speed data transfer both protocols (UHS-II and UFS) use a differential signaling physical interface as opposed to the single ended physical interface that legacy SD interfaces and eMMC interfaces use. The high speed protocols and the low speed protocols also differ in that they use one or more layers (e.g., link layer, transport layer) in a different way. The terms "high speed protocol/device/interface" and "fast protocol/device/interface" are used herein interchangeably. Likewise, the terms "low speed protocol/device/interface" and "slow protocol/device/interface" are also used herein interchangeably.

The host device traditionally communicates with legacy SD cards directly, by using a "point-to-point" communication scheme. UFS devices, on the other hand, are planned to communicate with their host devices through a data network of a chain topology type. In the chain topology, devices communicate with each other by using high-speed two-wire differential buses. Consequently, a host device that can support faster standards (i.e., UFS and/or UHS-II) and is also slow standard (e.g., SD) backward-compatible would be required to have two separate communication interfaces: a slow interface (e.g., an SD interface) and a faster interface (e.g., a UFS interface and a UHS-II interface). This means that such host device would have to deal with different communication protocols and topologies, which is costly in terms of number of input-output ("I/O") count, processor complexity, circuit board wiring, computer resources, host gate count, testing procedures, etc.

A UHS-II storage device can be designed to communicate with a host device by using a network topology known as "ring". "Ring" topology is a network setup in which multiple devices are connected in series, and the first device and the last device are connected directly to the host device). Because a ring topology provides one-way communication path between each pair of interconnected devices, ring networks may be disrupted by the failure of a single link. A cable break might isolate the other devices that are attached to the ring. Therefore, a host device using a UHS-II type storage device would require a special communication interface. Using the ring topology in host-storage device environment is problematic because, typically, this type of environment includes a removable storage device, and removal of a storage device would break the communication path. This means that a UHS-II based host device would be required to have three types of interfaces (as demonstrated by FIG. 14): (1) a UHS-II interface for the embedded devices that are connected through the ring topology, (2) a UHS-II interface for removable storage devices that support the UHS-II standard, and (3) a legacy SD interface to facilitate SD backward compatibility.

FIG. 1 is an example of conventional storage system architecture 100. As explained above, new data storage device protocols are designed to facilitate faster transfer of data and commands, for example relative to the legacy SD protocol. A conventional solution to cope with the two types of storage device protocols (i.e., slow protocol; e.g., legacy SD protocol, and fast protocol; e.g., UFS and UHS-II) allows a host processor (i.e., host processor 110) to handle them separately, as demonstrated by FIG. 1. Hereinafter, "legacy SD" is referred to as "SD" for short.

Assume that host processor 110 is designed to operate using both the UFS protocol and SD protocol, in order to make it SD backward compatible. In order to cope with the UFS protocol and SD protocol, host processor 110 is provided with two separate interfaces: interface 112 and interface 114. Interface 112 is use for communicating with a removable SD card 120 directly (i.e., via SD bus 130). Interface 114 is used for communicating UFS data/commands with external devices such as UFS input/output device 150, UFS input/output device 160, UFS-type memory device 170, and also with removable storage device 120; i.e., if removable storage device 120 is a UFS card or an SD-UFS card that is capable of communicating with host processor 110 by encapsulating SD data/commands within the UFS protocol. (Note: encapsulation of SD data/commands within the UFS protocol is referred to hereinafter as "SD-over-UFS".)

Because of the way the UFS protocol is designed, host device 110 can communicate with its peripherals via a bus that has a chain topology. Chain Topology is a wiring scheme in which device A is wired to device B, device B is wired to device C, device C is wired to device D, etc., and the last device in the chain is not looped back to device A but rather it communicates with device A through the other devices. With reference to FIG. 1, host processor 110 is communicating with device 150 via UFS bus 140, device 150 is communicating with device 160 via UFS bus 142, device 160 is communicating with UFS embedded memory 170 via UFS bus 144, and UFS embedded memory 170 is communicating with removable storage device 120 via UFS bus 146. The circuit configuration of FIG. 1 has the drawbacks of using two separate interfaces, an SD interface (i.e., interface 112) and a UFS interface (i.e., interface 114), and of requiring host CPU 110 to allocate space and resources, and dedicate circuits for both types of storage device protocols and topologies.

Figure 2:
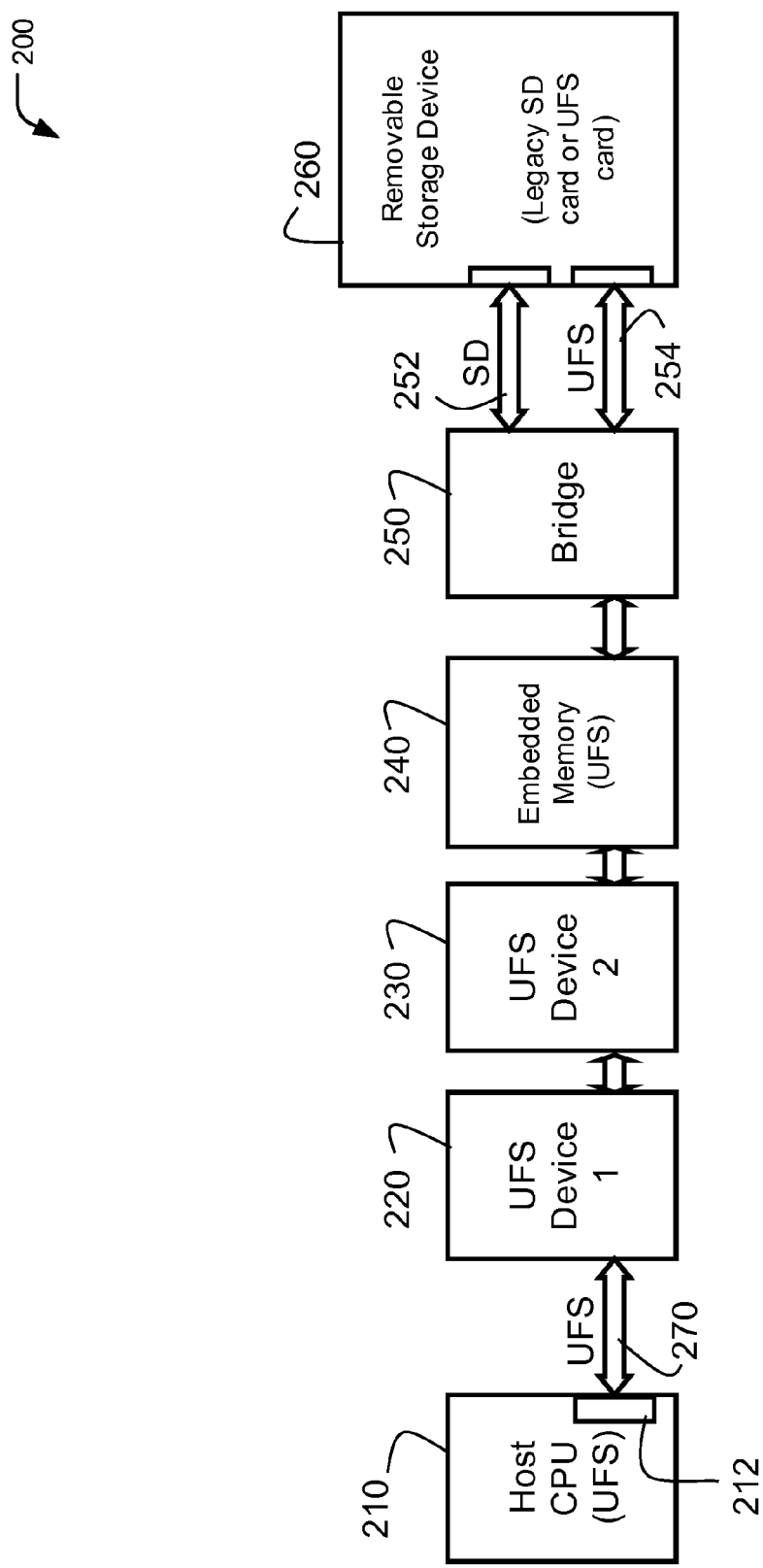
FIG. 2 is a diagram of a storage device network architecture using a chain topology and including a bridge according to an embodiment.

FIG. 2 is a diagram of a storage system architecture 200 with a bridge 250 according to an example embodiment. Host CPU 210 has one communication interface (i.e., communication interface 212) via which it communicates with external devices (e.g., removable storage device 260). In this architecture, which uses a chain topology, both the slow storage device interface (e.g., legacy SD interface) and the high speed interface (e.g., UFS interface) will communicate with the host through the bridge by using the high speed storage device protocol. This way, a system that includes a host device that uses a high speed protocol and a bridge such as bridge 250 is backward compatible, which means that it can operate with devices that use low speed protocols (Note: in this example, the faster storage device protocol is the UFS protocol and the slow storage device protocol is the legacy SD protocol.)

In the example of FIG. 2, host CPU 210, UHS-II type input/output module 220 (e.g., an execute in place ("XIP") device), UHS-II type input/output module 230 (e.g., WiFi device), and embedded memory 240 are designed to receive and transmit data and commands by using the UFS protocol. This means that communication between each pair of interconnected devices, via the corresponding UFS bus, is straight forward; namely, no changes are required to be made in the storage device protocol as the data and commands propagate along the chain (chain topology) network from host CPU 210 to input/output module 220 (via UFS bus 270), from input/output module 220 to input/output module 230 (via a UFS bus that connects them), and from input/output module 230 to embedded memory 240 (via a UFS bus that connects them).

Even though host CPU 210 does not have an interface dedicated to legacy SD cards (note: it has only one high-speed interface; i.e., interface 212, which, in this example, is designed for UFS communication), it uses high-speed interface 212 to communicate with legacy SD cards by using bridge 250. Bridge 250 facilitates communication between host CPU 210 and removable storage device 260, whether storage device 260 be a 'slow' card (e.g., legacy SD card) or a 'fast' card (e.g., UFS card, SD-over-UFS compatible SD card).

Bridge 250 can be either in a "transparent" state or in a "conversion" state, depending on the type of protocol that host processor 210 uses and on the type of protocol that removable storage device 260 uses. That is, bridge 250 identifies these types of protocols, for example by using a connection analyzer such as connection analyzer 442 of FIG. 4), and acts accordingly: it transitions to (or remains in) the "conversion" state if removable storage device 260 uses the legacy SD protocol, to thereby bridge between the UFS storage device protocol used by UFS-type host CPU 210 and the legacy storage device protocol used by legacy SD card 260, and it transitions to (or remains in) the "transparent" state if removable storage device 260 and host CPU 210 use the same protocol which, in this example, is the UFS protocol. (Note: regarding the present disclosure, a UFS card and a SD-over-UFS type card are collectively referred to herein as UFS card.)

While in the "conversion" state, bridge 250 receives data/commands from host CPU 210 (via devices 220, 230, and 240) in the UFS storage device protocol and sends them to legacy SD card 260, via legacy SD connection 252, by using the legacy SD storage device protocol, and receives data/commands from legacy SD card 260, via legacy SD connection 252, in the legacy SD storage device protocol and sends them to host processor 210 (via devices 240, 230, and 220) by using UFS storage device protocol. As explained above, no protocol change is required if host CPU 210 and removable storage device 260 use the same storage device protocol (in this example the UFS protocol). If host CPU 210 and storage device 260 are UFS devices, bridge 250 and storage device 260 are connected via UFS connection 254. SD connection 252 and UFS connection 254 are shown logically as separate connections. However, physically, they may have terminals in common. A bridge (e.g., bridge 250) in the transparent state is transparent to communications between host CPU 210 and removable storage device 260. Storage system architecture 200 includes a bridge as a separate device (i.e., bridge 250). However, the bridge functionality may be incorporated into the embedded memory (e.g., embedded memory 240), as exemplified by FIG. 3, which is described below.

There may be SD-UFS combined cards that include two logically separate sets of host interface terminals, which may have common connection terminals; i.e., one set which conforms to legacy SD card and another set which conforms to UFS card, and two sets of storage device interfaces; i.e., one set of storage device interface for operating the card as a legacy SD and another set of storage device interface for operating the card as a UFS card. Having two sets of terminals and front-ends allows SD-UFS cards to be used either as a legacy SD card or as a UFS card, depending on the type of interface and socket accommodating the SD-UFS card. Bridge 250 may have only one storage device interface (not shown in FIG. 2) that can accommodate both types of removable storage device 260. Alternatively, bridge 250 may have separate storage device interfaces (also not shown in FIG. 2): one storage device interface which is dedicated for a legacy SD cards, and another storage device interface which is dedicated for UFS cards.

In one implementation, bridge 250 may be connected to host CPU 210 as shown in FIG. 2 (i.e., via one or more intermediate devices). In another implementation, bridge 250 may be connected directly to host CPU 250. In another implementation, bridge 250 may be connected directly to a communication hub that is connected, directly or via one or more devices, to host CPU 250.

Figure 3:
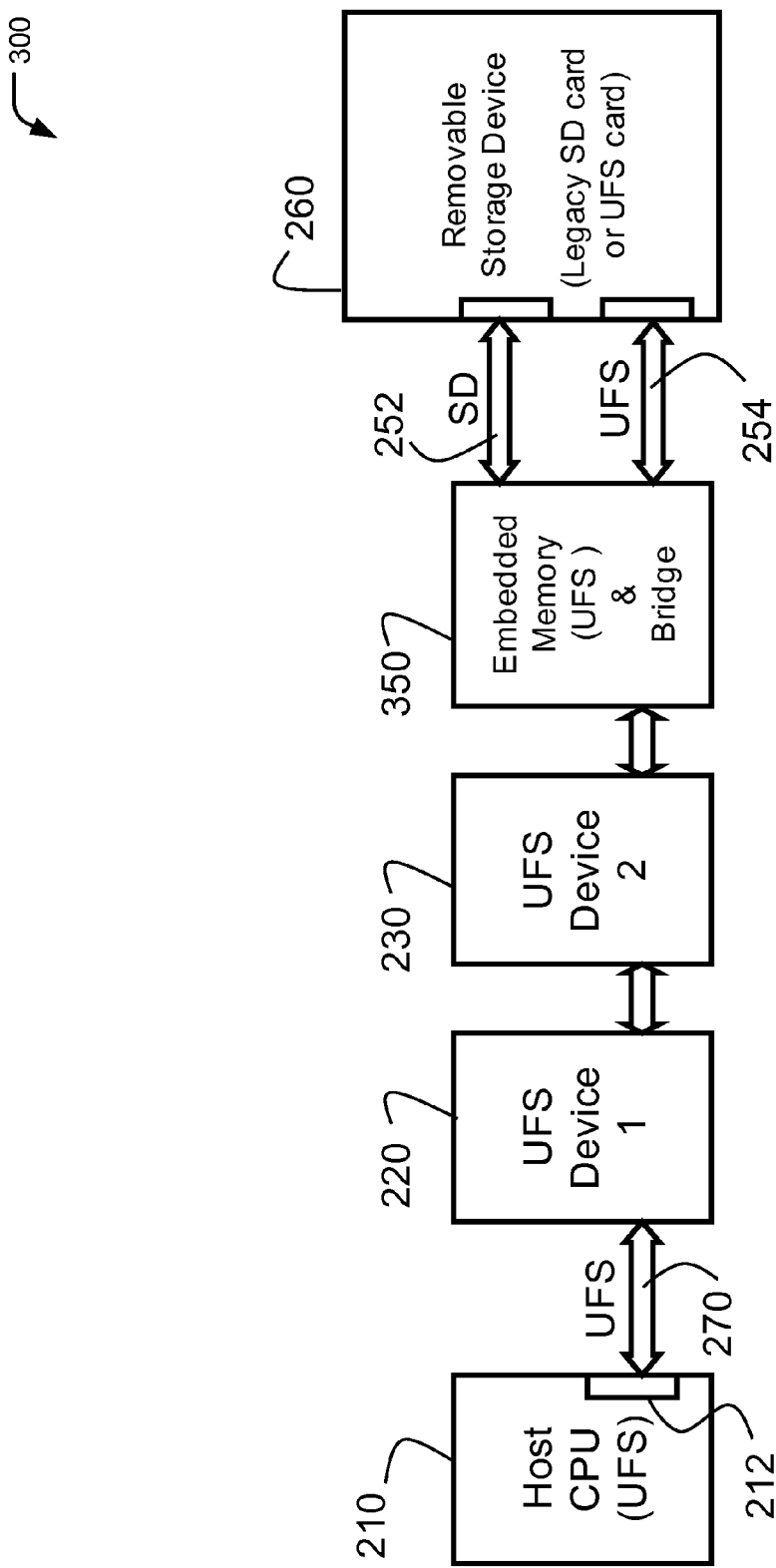
FIG. 3 is a diagram of a network architecture using a chain topology and including a bridge according to an embodiment.

FIG. 3 is a diagram of a storage system architecture 300 with a device 350 that is a combination of a bridge and an embedded memory according to an example embodiment. Storage system architecture 300 is identical to storage system architecture 200 of FIG. 2 in all respects, except that in storage system architecture 300 the bridge and the embedded memory are combined in one device, as shown at 350. Using one device (i.e., device 350) that combines the functionalities of the embedded memory and bridge is beneficial as it saves space, internal wiring, input/output interfaces, etc.

Figure 4:
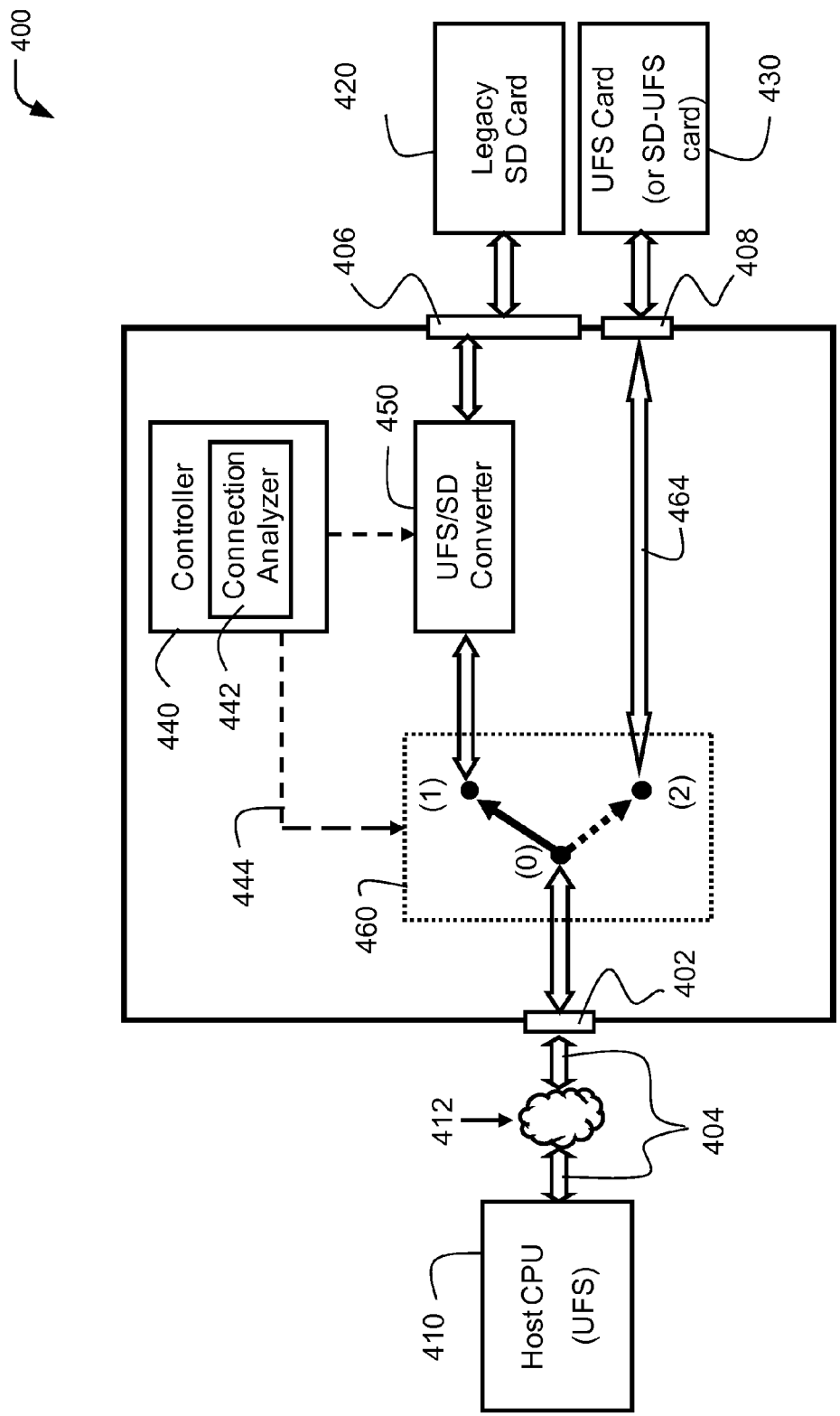
FIG. 4 shows a bridge according to an embodiment.

FIG. 4 shows a bridge 400 according to an example embodiment. Bridge 400 includes a host device interface 402. Host device interface 402 is connected to a communication bus 404 that is connected (possibly via other devices 412 that are part of the chain) to a host CPU that uses a first storage device protocol (e.g., UFS). Bridge 400 also includes a first storage device interface 406 for interfacing with a removable storage device 420 that uses a second storage device protocol (e.g., legacy SD), and a bi-directional storage device protocol converter (SDPC) 450 for converting the first storage device protocol to the second storage device protocol and vice versa. Bridge 400 also includes a controller 440 and a switching system 460. Switching system 460 is configurable by controller 440 to connect protocol converter (SDPC) 450 between host device interface 402 and first storage device interface 406 if the first storage device protocol (i.e., the storage device protocol used by host CPU 410) differs from the second storage device protocol (i.e., the storage device protocol used by the removable storage device), and to disconnect protocol converter 450 and to connect host device interface 402 to second storage device interface 408 if the first storage device protocol and the second storage device protocol are the same.

Controller 440 may know in advance the type of host CPU and/or the type of storage device protocol it uses. If controller 440 does not know the type of host CPU and/or the type of storage protocol the host device uses in advance, then controller 440, in conjunction with a connection analyzer 442, monitors host device interface 402, to infer the type of host CPU and/or the type of storage device protocol that host CPU uses from information originating from host CPU 410. Controller 440 also uses connection analyzer 442 to monitor storage device interfaces 406 and 408 to detect which storage device is connected to bridge 400 and/or which storage device protocol is used by a storage device that is connected to storage device interfaces 406 or to storage device interface 408. Controller 440, then, determines whether storage device 420 uses a first storage device protocol which is also used by host CPU 410, or a second storage device protocol that is not used by host CPU 410. Controller 440 may determine the type of the storage device protocol used by the two sides (i.e., host CPU 410 and storage device 420), and compare them to determine whether a protocol conversion is required. Alternatively, controller 440 may determine that the two sides use the same storage device protocol or different storage device protocols without determining the type of each used storage device protocol. Typically, a device such as host CPU 410 and storage device 420 communicates an explicit message regarding the type and/or version of the storage device protocol it uses to the 'other' side with which it communicates. Therefore, controller 440 may determine the storage device protocols based on such communication. Alternatively, controller 440 may infer the type of storage device protocols from monitored communications.

If the first storage device protocol differs from the second storage device protocol, this means that the data and commands, which host CPU 410 propagates through bridge 400 to SD card 420 by using a certain storage device protocol (e.g., UFS protocol), has to be sent to card 420 by using a different storage device protocol (i.e., legacy SD protocol) that SD card 420 "understands". In this case, controller 440 sends a control signal 444 to switching system 460 to connect contact "(0)" to contact "(1)", to thereby connect protocol converter 450 to host device interface 402 (note: in the example shown in FIG. 4, protocol converter 450 is permanently connected to storage device interface 406). This way, host CPU 410 communicates data/commands to storage device 420 by using the first storage device protocol, which is USF protocol in this example, and UFS/SD converter 450 converts the UFS protocol to a second storage device protocol which, in this example is the legacy SD protocol, which is usable by legacy SD card 420. The procedure of receiving data, commands and signaling from a first device in a first storage device protocol, translating the data/commands/signaling, and transmitting the translated data/commands/signaling to a second device by using another storage device protocol is referred to herein as "protocol conversion", or "conversion" for short, hence using the term "converter" and lingual derivatives thereof. Such a conversion typically includes encapsulating a slow protocol (e.g., legacy SD protocol) within a fast protocol (e.g., UFS protocol, UHS-II protocol), and de-capsulating the slow protocol from the fast protocol. While "encapsulation" means embedding a protocol within another protocol, "de-capsulation" means the opposite operation. A SCSI from/to SD conversion also includes basic SD-to-SCSI and SCSI-to-SD commands translation (and the translation is performed, e.g., by a translator such as commands translator 1130 of FIG. 11). Protocols conversion also includes signaling translations (e.g., "busy" signaling translations) in the link layer level (and the translation is performed e.g., by a translator such as link signaling translator 1185 of FIG. 11).

If the storage device protocol used by host CPU 410 is the same as the storage device protocol used by the removable storage device that is connected bridge 400 (in this case UFS card 430), controller 440 sends a control signal 444 to switching system 460 to connect contact "(0)" to contact "(2)", to thereby connect host device interface 402 to storage device interface 408 directly 464, that is, without going through converter 450 (it is possible that other components could be connected between 402 and 408).

As explained in connection with FIG. 2, if host CPU 210 is of the UFS type, bridge 250 can have one storage device interface that is configured to accommodate one storage device that can be a legacy SD card, SD-UFS card or UFS card, or two storage device interfaces: one for legacy SD cards and another for SD-UFS cards or UFS cards.

Figure 5:
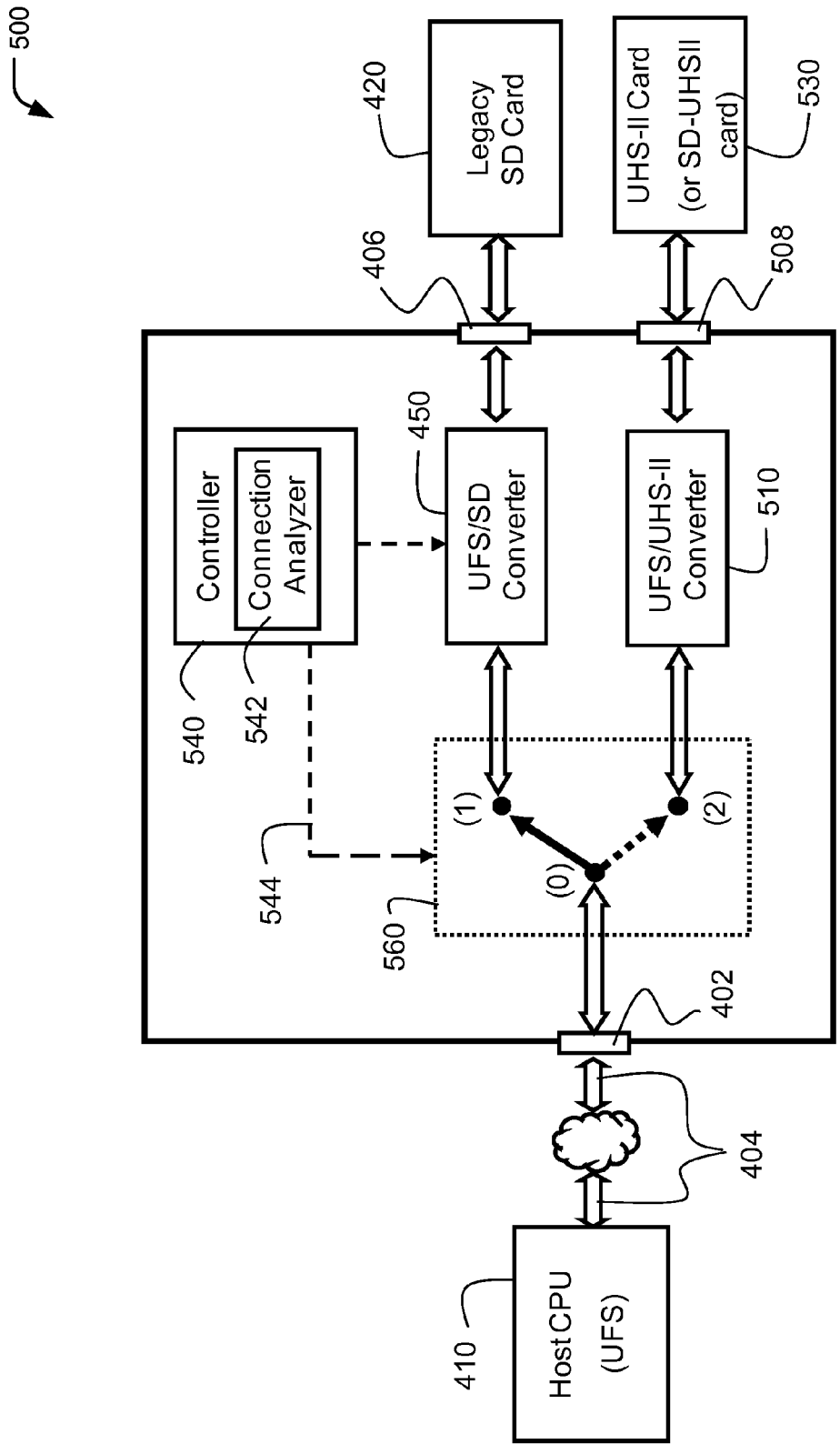
FIG. 5 shows a bridge according to an embodiment.

FIG. 5 shows a bridge 500 according to an additional example embodiment. Bridge 500 is similar to bridge 400 except that bridge 500 includes two protocol converters: one (i.e., protocol converter 450) that converts from UFS protocol to legacy SD protocol and vice versa, as shown also in FIG. 4, and another (i.e., protocol converter 510) that converts from UFS protocol to UHS-II protocol and vice versa. (Note: only one removable storage device; i.e., card 420 or card 530, can be connected to bridge 500 at a time.)

If connection analyzer 542 notifies controller 540 that legacy SD card 420 is currently connected to bridge 500, controller 540 sends a control signal 544 to switching system 560 to connect contact "(0)" to contact "(1)", as also shown in and described in connection with FIG. 4. If connection analyzer 542 notifies controller 540 that UHS-II card 530 (or SD-UHS-II card which uses UHS-II protocol) is currently connected to bridge 500, controller 540 sends a control signal 544 to switching system 560 to connect contact "(0)" to contact "(2)", to enable conversion of the UFS protocol, which is used by host PCU 410, to the UHS-II protocol, which is use by UHS-II card (or SD-UHS card) 530 and vice versa. As host CPU 410 uses the UFS protocol, bridge 500, like bridge 400, is configured in a chain topology. In the case of a host CPU using the UHS-II protocol, the bridge may be configured in a ring topology, as demonstrated by FIG. 6.

Figure 6:
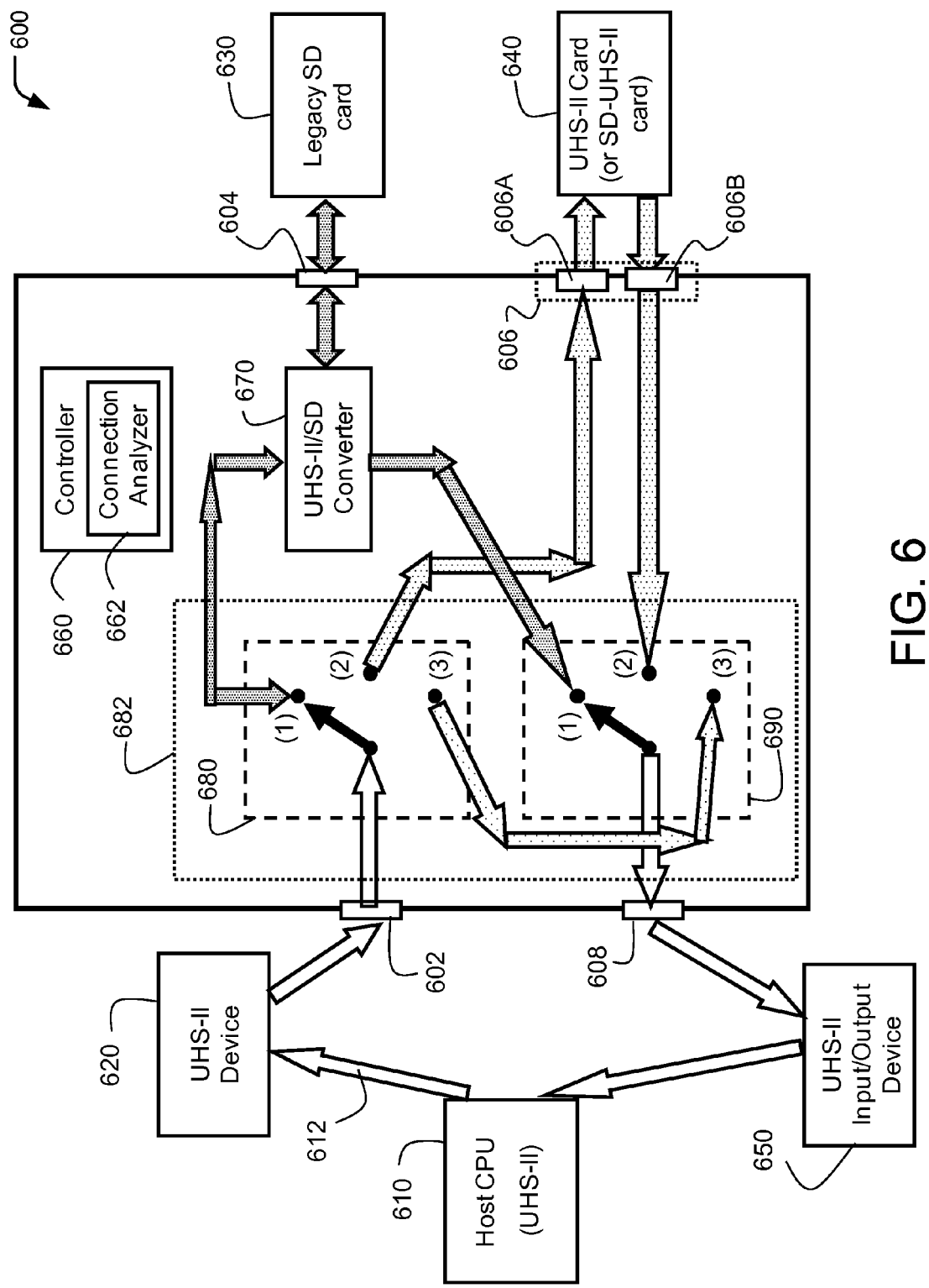
FIG. 6 shows a bridge according to an embodiment.

FIG. 6 shows a bridge 600 according to yet another example embodiment. Host CPU 610 uses the UHS-II protocol to communicate with external devices (e.g., UHS-II device 620, legacy SD card 630 or UHS-II card 640 (or SD-UHS-II card 640), and UHS-II Input/Output device 650) through a bus having a ring topology. (Note: only one of legacy SD card 630 and UHS-II card 640 is connected to bridge 600 at a time.) Bridge 600 includes host device interface 602 for receiving data and commands from UHS-II device 620, storage device interface 604 for transferring the data and command to, and receiving them back from, legacy SD card 630, storage device interface 606 for transferring the data and command to, and receiving them back from UHS-II card 640, and storage device interface 608 for transferring the data and command to UHS-II device 650 that may be a UHS-II type embedded memory or a UHS-II type Input/Output device or any other device that uses the UHS-II protocol.

Bridge 600 also includes a controller 660 that functions in a similar way as controller 440 of FIG. 4 and controller 540 of FIG. 5, a bi-directional SDPC 670 for converting the UHS-II protocol used by host CPU 610 to the legacy SD protocol used by legacy SD card 630 (and vice versa), and a switching system 682 that includes a three-position switch 680 and a three-position switch 690. Switch 680 and switch 690 are designed and controlled in such a way that they are always in the same position and always move together from one position to another position. For example, if switch 680 is, say, in position "(1)", switch 690 is also in position "(1)", and if controller 660 transitions one of them (e.g., switch 680) to position "(3)" (for example), the other switch (e.g., switch 690) also transitions to the same position.

If the storage device connected to bridge 600 is a legacy SD card such as legacy SD card 630, controller 660 sets switches 680 and 690 to position "(1)", which state is shown in FIG. 6. In position "(1)", data and commands originating from host CPU 610 propagate through UHS-II device 620, are received at bridge 600, and forwarded to bi-directional UHS-II/SD converter 670. UHS-II/SD converter 670 converts the UHS-II protocol to the legacy SD protocol and forwards the data/command to legacy SD card 630, via storage device interface 604, using the legacy SD protocol. (Note: the term "converts" is to be construed in the way explained above). Legacy SD card 630 transfers data or a response to UHS-II/SD converter 670 by using the legacy SD protocol, and UHS-II/SD converter 670 sends the data or the response to the next device in the ring (i.e., UHS-II Input/Output device 650) by using the UHS-II protocol. Then, the data/command continues to propagate through the ring by using the UHS-II protocol. If the data/command sent by host CPU 610 is not intended for legacy SD card 630, the requirement to convert command/data to/from the legacy SD protocol can be avoided by transferring the command/data to the next device in the ring (i.e., UHS-II Input/Output device 650) through storage device interface 608 without using protocol conversion. One way to enable this feature is to store in the bridge identification information ("ID") of the removable storage device. Such an ID would allow controller 660 to know whether the command/data is intended for the removable storage device (e.g., card 630 or 640) or not.

If the storage device connected to bridge 600 is a UHS-II-compatible card 640 (i.e., UHS-II card or SD-UHS-II card), controller 660 sets switches 680 and 690 to position "(2)" because no protocol conversion is required (i.e., both host CPU 610 and card 640 are genuine UHS-II devices). In position "(2)", data/command originating from host CPU 610 propagate through UHS-II device 620, are received at bridge 600, and forwarded to UHS-II card 640 directly (i.e., without undergoing protocol conversion), via storage device interface 606A. If the data/command is not intended for UHS-II card 640, UHS-II card 640 forwards them, via storage device interface 606B and contact "(2)" of switch 690, to the next device in the ring which, in this example, is UHS-II Input/Output device 650. If one of the devices in a ring type data network is removed and no measure is taken to bridge the gap created by the removal of the device, the communication loop is disconnected. Turning again to FIG. 6, a connection analyzer 662, which is similar to connection analyzer 442 of FIG. 4 (for example), monitors host device interface 602, and storage device interfaces 604, 606, and 608, to detect devices that are connected to them and to determine the storage device protocol that each device uses. Connection analyzer 662 notifies controller 660 of the status of the monitored interfaces (i.e., a device is connected to interface 'x' or not, a device connected to interface 'x' is using protocol 'y', etc.) If connection analyzer 662 notifies controller 660 that neither a legacy SD card is connected to storage device interface 604 nor a UHS-II compatible card is connected to storage device interface 606, controller 660 sets switch 680 and switch 690 to position "(3)".

If switches 680 and 690 are in position (1), bridge 600 is in a "conversion" state. If switches 680 and 690 are in position (2), bridge 600 is in a "transparent" state. If switches 680 and 690 are in position (3), bridge 600 is in a "bypass" state. By setting switches 680 AND 690 to position "(3)", both storage device interfaces 604 and 606 are bypassed. That is, the bridge's ring input (i.e., host device interface 602) is internally connected to the bridge's ring output (i.e., storage device interface 608), thereby closing the ring loop via bridge 600. (Note: if a removable storage device; e.g., legacy SD card 630 or UHS-II card 640, is connected to bridge 600, the ring loop is closed via the UHS-II/SD converter or via UHS-II device 640, respectively.)

Figure 7:
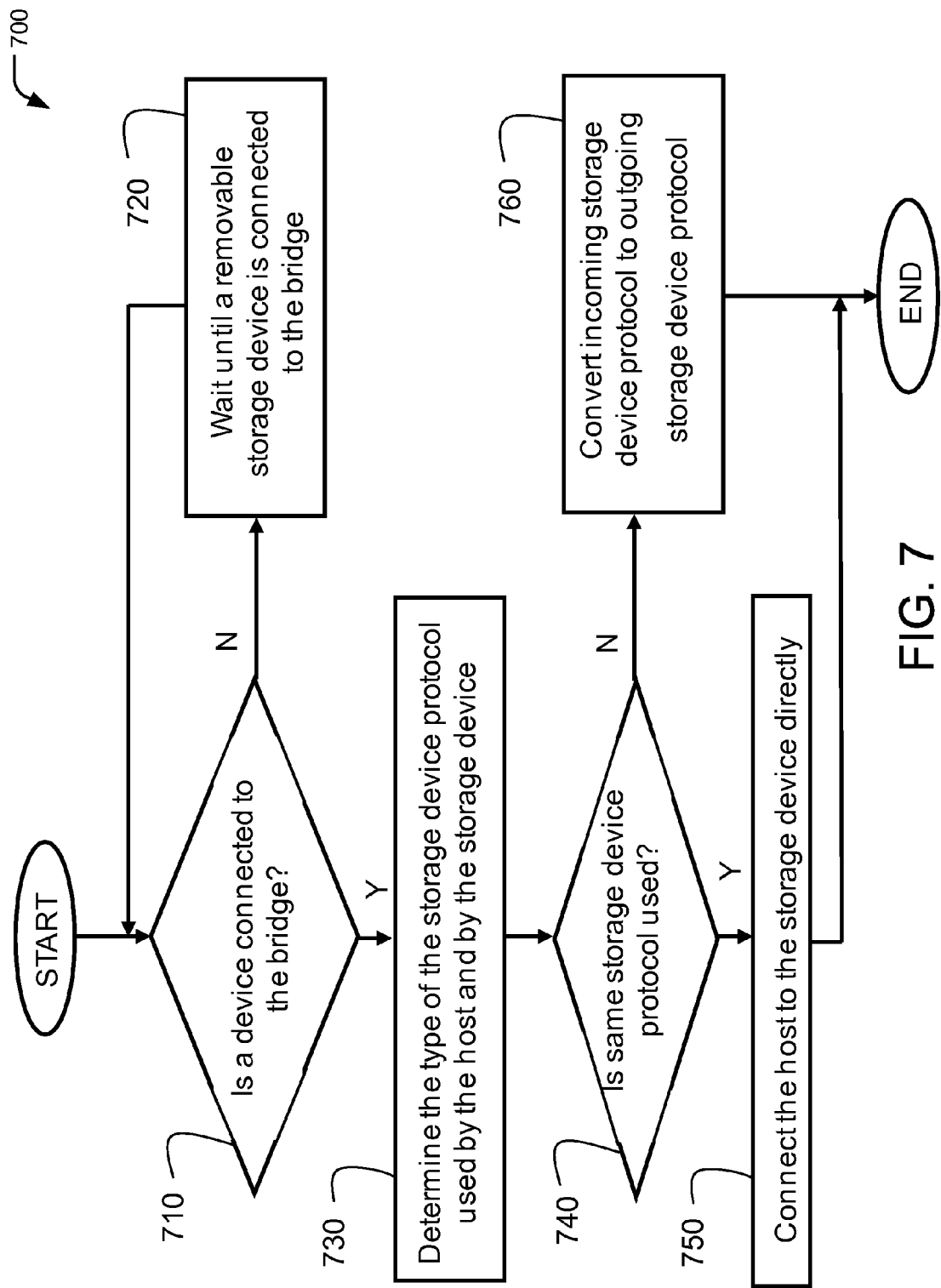
FIG. 7 shows a method for operating a bridge according to an embodiment.

FIG. 7 is a method for operating a bridge according to an example embodiment. Assume that a bridge, which may be similar to bridge 400 or 500, is permanently connected, indirectly or directly, to a host CPU as the two devices are embedded in the same host device. At step 710, a connection analyzer, such as connection analyzer 542, checks whether a removable storage device (e.g., legacy SD card 420 or UHS-II compatible card 530) is connected to the bridge, and if such a device is connected to the bridge, it detects 730 the type of the storage device protocol used by the connected device. If no removable storage device is connected to the bridge (shown as "N" at step 710), the bridge remains, or enters, an idle state and waits, at step 720, until a removable storage device is connected to it. If a removable storage device is connected to the bridge (shown as "Y" at step 710), the connection analyzer identifies, at step 730, for the controller the storage device protocol used by the host CPU and the storage device protocol used by the removable storage device. (As noted, the controller may already know the protocol used by the host CPU, in which case it does not need to "determine" the storage device protocol used by the host CPU.) At step 740, a controller similar to controller 540 (for example) checks whether the two storage device protocols are the same, and, in the case of the embodiment shown in FIG. 5, if the protocols are not the same, controller 540 determines what type of protocol conversion should be used. If the two storage device protocols are the same (shown as "Y" at step 740), controller 540 connects host CPU 410 and the removable storage device directly, at step 750, as demonstrated in FIG. 4 (i.e., contact "(2)" is connected to interface 406 or to interface 408) and in FIG. 6 (i.e., communication path established by using contacts "(2)"). If the two storage device protocols differ (shown as "N" at step 740), the controller uses a suitable bi-directional protocol converter to convert an incoming storage device protocol to an outgoing storage device protocol. Data/command communications from the host CPU to the bridge and data/command communications from the removable storage device to the bridge are regarded as "incoming communication", as the data/command enter the bridge. Data/command communications from the bridge to the host CPU and data/command communications from the bridge to the removable storage device are regarded as "outgoing communication", as the data/command exit the bridge.

Figure 8:
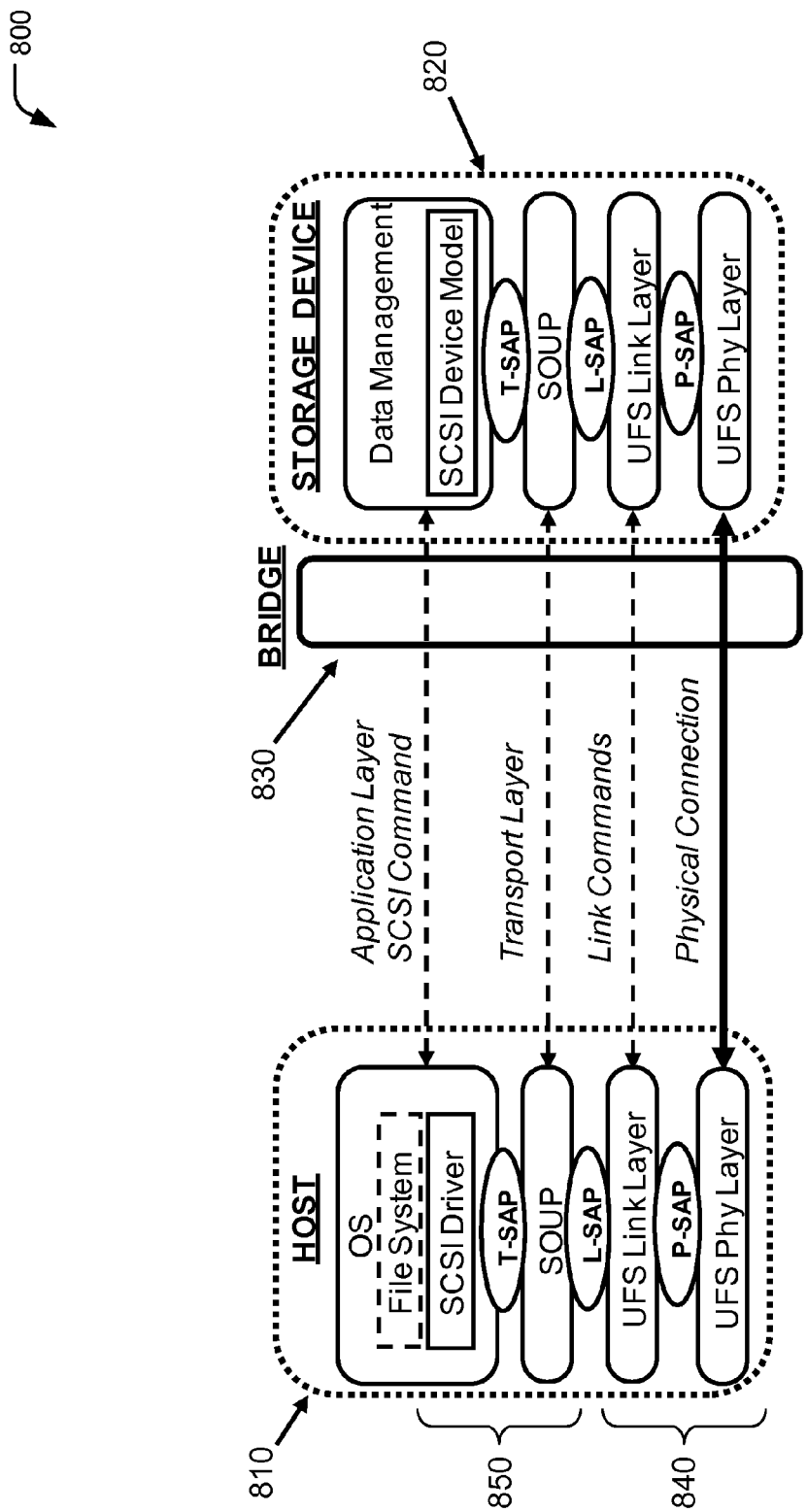
FIG. 8 schematically illustrates communication between a host device and a storage device via a bridge where storage device interface commands are transferred transparently both ways by using the SCSI over UFS protocol.

FIG. 8 schematically illustrates four conventional communication layers that are used to exchange data and commands between a host device 810 and a removable storage device 820 via a bridge 830, where data and commands are transferred both ways by using small computer system interface ("SCSI") standards. FIG. 8 refers to a scenario in which the storage device protocol used by a host device and the storage device protocol used by a storage device are the same, for which reason the bridge is communication-wise transparent; i.e., no storage device protocol conversion is exercised. FIG. 8 is related to FIG. 4, in which a UFS card or an SD-UFS card 430 is connected to bridge 400. Briefly, "SCSI" is a set of standards for physically connecting, and transferring data between, computers and peripheral devices. The SCSI standards define commands, protocols, and electrical and optical interfaces. SCSI can be used to connect a wide range of devices. For the UFS standard only a limited part of the SCSI protocol is used.

The layers, which have been defined by the UFS task force working for JEDEC, are "physical connection" layer, "link commands" layer, "transport" layer and "application" layer. Host device 810 sends and receives data/commands to/from storage device 820 by using UFS-configured physical layer and UFS-configured link layer (the two layers are shown at 840), and by using SCSI-configured transport layer and SCSI-configured application layer (the two layers are shown at 850). (Note" "SOUP" is an abbreviation of "SCSI-over-UFS protocol".) Storage device 820 is configured to use the same communication layers as host device 810 uses. Therefore, bridge 830 is communication-wise transparent to both devices; i.e., no protocol conversion is required/used.

Figure 9:
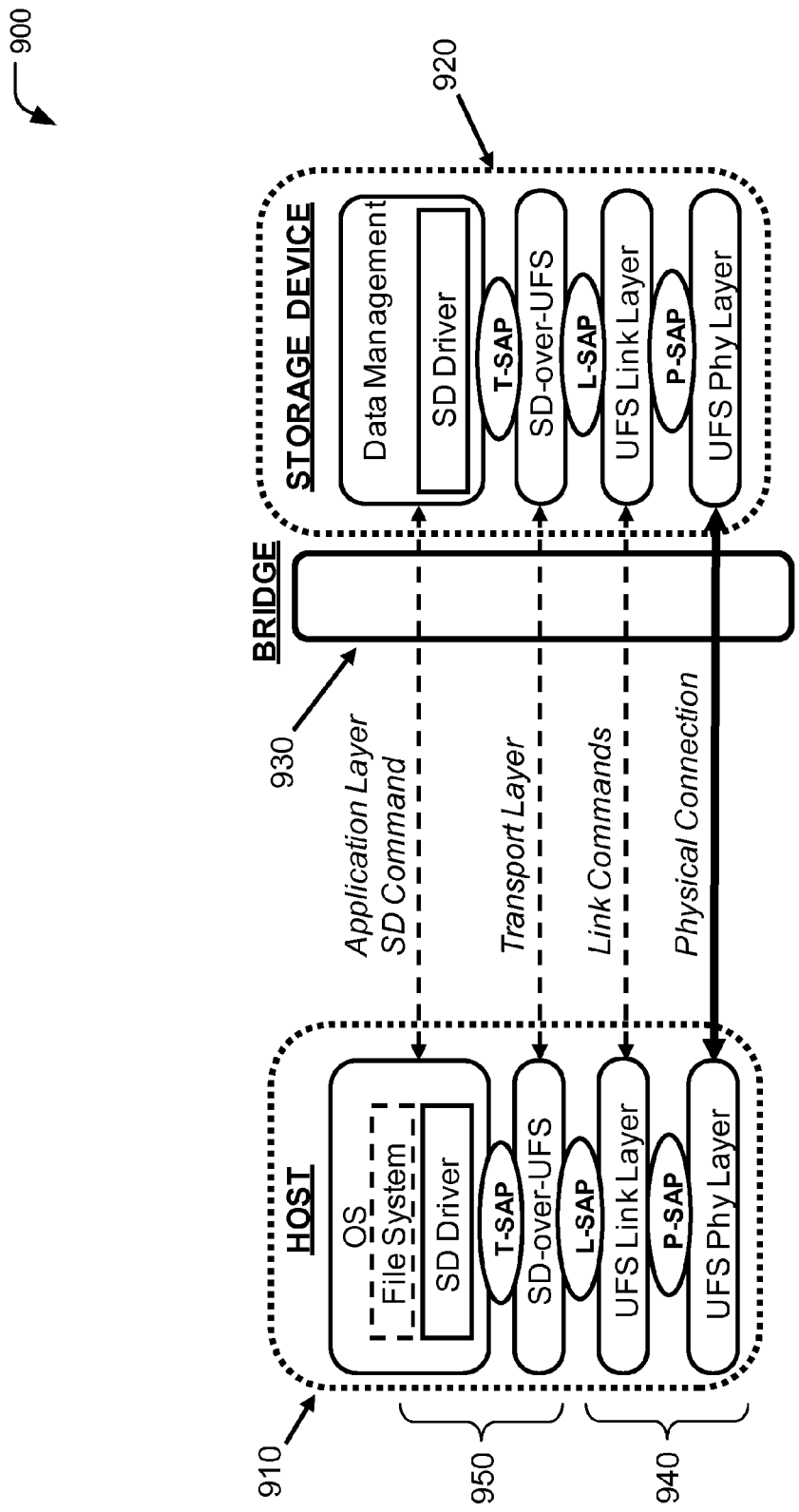
FIG. 9 schematically illustrates communication between a host device and a storage device via a bridge where Storage Device interface commands are transferred transparently both ways using the SD over UFS protocol.

FIG. 9 schematically illustrates the conventional communication layers as in FIG. 8, but now they are used to exchange SD data and SD commands between a host device 910 and a removable storage device 920 via a bridge 930. The SD data and SD commands are exchanged, through bridge 930, between host device 910 and storage device 920 by using SD-over-UFS configuration, as host device 910 and storage device 920 are UFS-configured devices, and the SD data and SD commands are communicated through UFS communication. By "SD-over-UFS configuration" and "SD-over-UFS communication" is meant that SD data and commands are encapsulated within (i.e., they are inserted as a payload of) the UFS signal. FIG. 9 refers to a scenario in which the storage device protocol used by a host device and the storage device protocol used by a storage device are the same, for which the bridge is communication-wise transparent; i.e., no storage device protocol conversion is exercised. Host device 910 sends and receives SD data/commands to/from storage device 920 by using UFS-configured physical layer and UFS-configured link layer (the two layers are shown at 940), and by using SD-over-UFS transport layer and SD-configured application layer (the two layers are shown at 950). Storage device 920 is configured, communication layer wise, in the same way as host device 910. Therefore, bridge 830 is communication-wise transparent to both devices; i.e., no protocol conversion is required/used.

Figure 10:
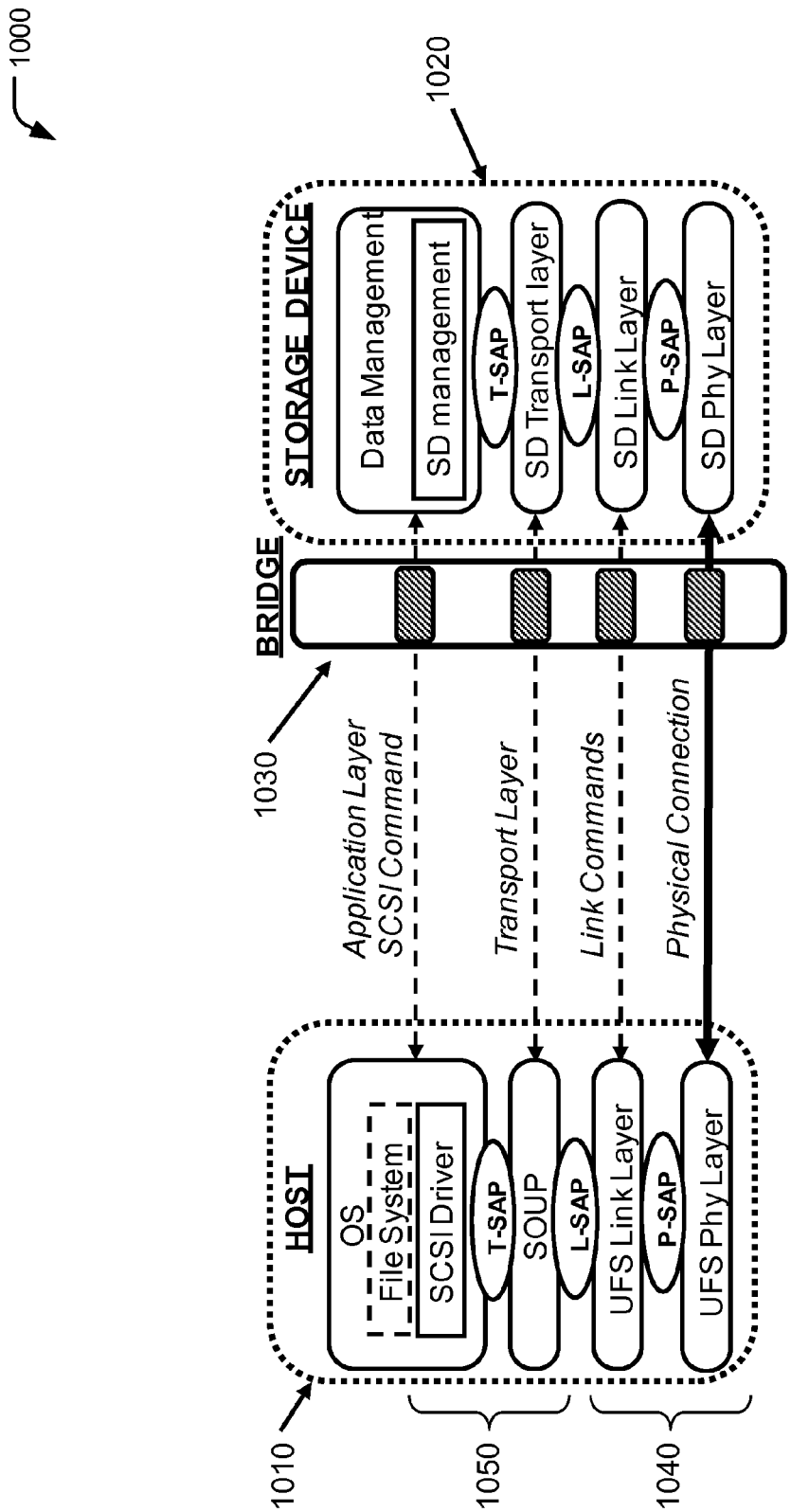
FIG. 10 schematically illustrates communication between a host device using the SCSI over UFS protocol and a storage device using the legacy SD protocol via a bridge.

FIG. 10 schematically illustrates the conventional communication layers as in FIG. 8, but in FIG. 10 they are used to transfer data and commands between a host device 1010 using SCSI-over-UFS protocol and a removable storage device 1020, via bridge 1030, that is configured as legacy SD card. Host device 1010 uses a UFS physical layer and a UFS link layer (both layers are shown at 1040), and a SCSI transport layer and a SCSI application layer (the latter two layers are shown at 1050). Legacy SD card 1020 uses an SD physical layer, an SD link layer, an SD transport layer and an SD application layer. FIG. 10 refers to a scenario in which the storage device protocol used by a host device differs from the storage device protocol used by a storage device, for which a storage device protocol conversion is exercised.

Figure 11:
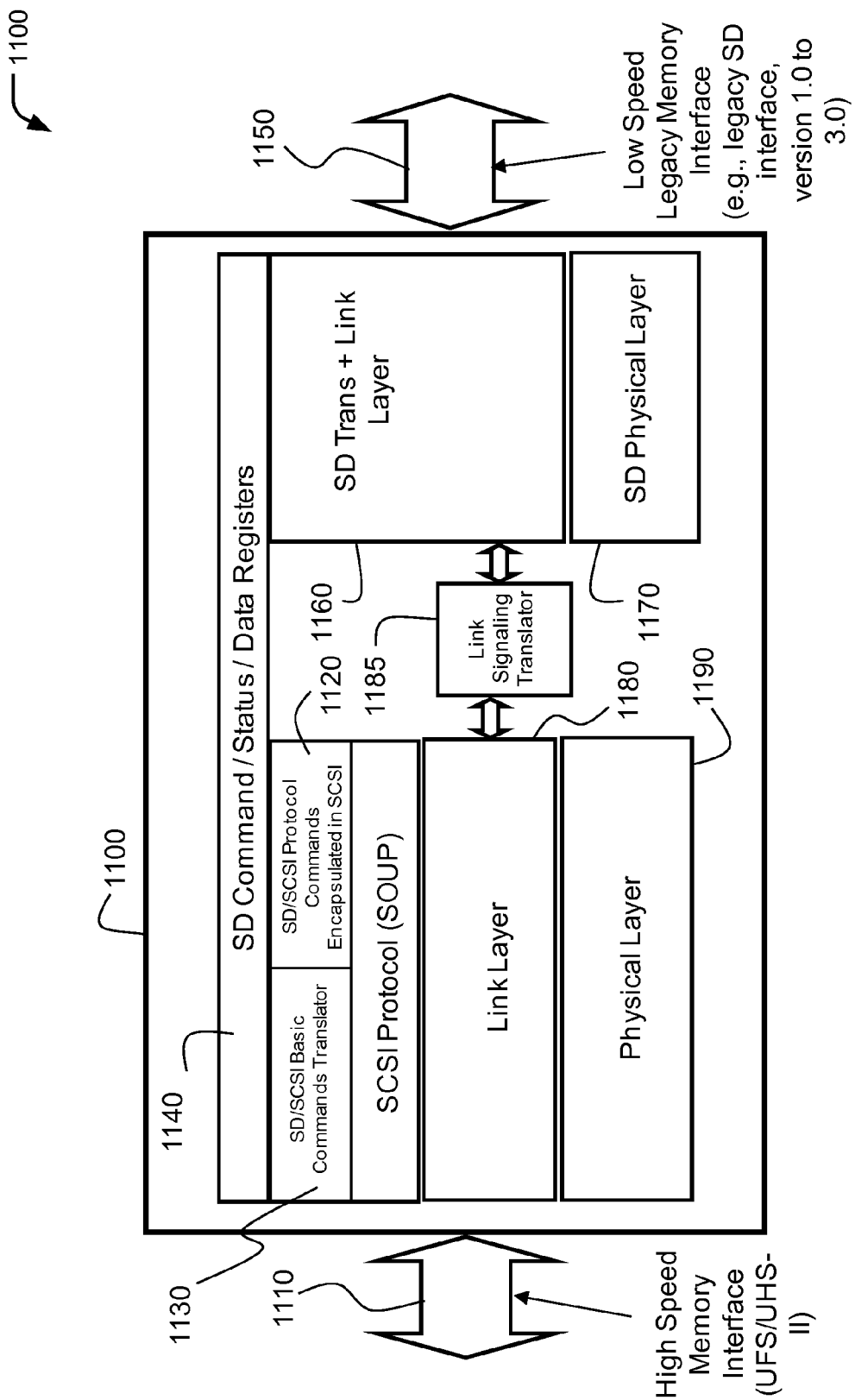
FIG. 11 shows a bridge functional layout according to an embodiment.

FIG. 11 schematically illustrates a conversion scheme used by a bridge such as bridge 1030 of FIG. 10, for converting a high-speed protocol to a legacy (slow) SD protocol and visa verse. The bridge scheme applied by storage device protocol converter (SDPC) 1100 facilitates communication of data/commands between a host device and an SD card by using SCSI transport and application layer. SDPC 1100, which shows SDPC 450 and SDPC 670 in more details, receives 1110 a SCSI command that is "riding" over a high speed protocol (e.g., UFS or UHS-II). The SCSI basic commands (e.g., "Read"/"Write") are translated 1130 into a corresponding SD command. The SD protocol specific commands (e.g., "Write Protect", "SD Security") are transferred from the host device encapsulated inside the SCSI protocol. Such a command shall undergo a de-capsulation process (1120). The SD command (i.e., either the outcome of SD/SCSI translator 1130 or SD/SCSI protocol encapsulator 1120) is held in registers 1140 which are common to the legacy SD Common/Status/Data registers. The legacy SD card protocol transfers the commands to the legacy SD card through memory device interface 1150 (the SD card is not shown in FIG. 11) by using SD transport and link layer 1160 and SD physical layer 1170. Link layer signaling used for command/data flow control (e.g., "Ready"/"Busy") are translated, by using link signaling translator 1185, from the high speed protocol link layer to the legacy SD protocol link layer. Any Command-Response, Data and signaling sent from the storage device to the host device undergo a similar process (i.e., command responses and data are loaded through the legacy SD protocol to the common set of registers 1140. Basic information is translated to SCSI by SD/SCSI translator 1130, and SD specific commands will be encapsulated within SCSI by SD/SCSI encapsulator 1120. The generated SCSI command is transferred outside through high-speed memory interface 1110 using the link layer 1180 and physical layer 1190 of the high speed protocol. Link layer signaling will be translated by using link signaling translator 1185 to high speed link layer signaling).

Figure 12:
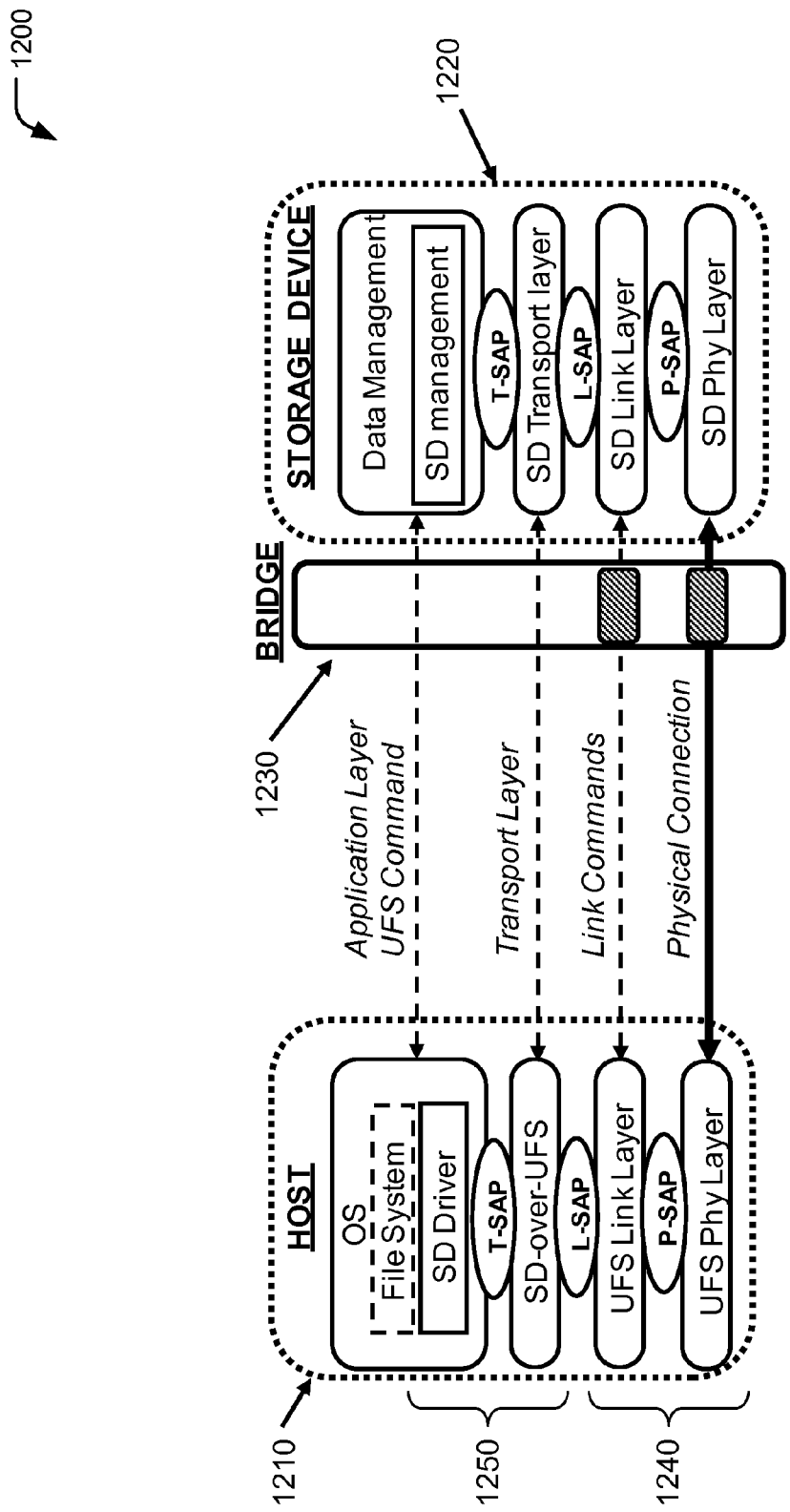
FIG. 12 schematically illustrates communication between a host device using SD-over-UFS and a storage device using legacy SD protocol via a bridge.

FIG. 12 schematically illustrates the conventional communication layers as in FIG. 8, but in FIG. 12 they are used to transfer data and command, via bridge 1230, between a host device 1210 using SD-over-UFS protocol and a removable storage device 1220 such as legacy SD card. Host device 1210 uses a UFS physical layer and a UFS link layer (both layers are shown at 1240), and an SD transport layer and an SD application layer (the latter two layers are shown at 1250). FIG. 12 refers to a scenario in which the storage device protocol used by a host device differs from the storage device protocol used by a storage device, for which a storage device protocol conversion is exercised.

Figure 13:
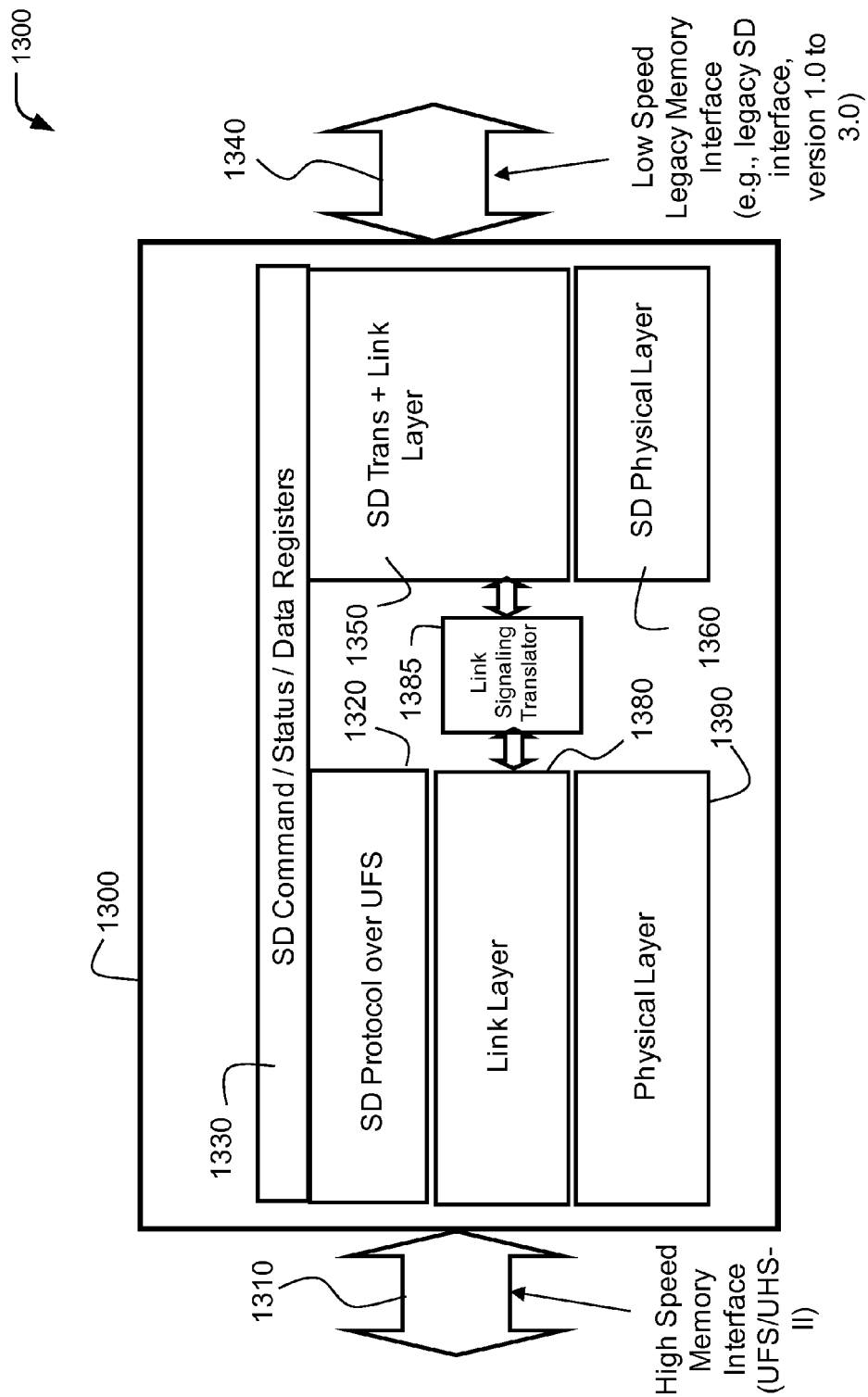
FIG. 13 shows a bridge functional layout according to an embodiment.

FIG. 13 schematically illustrates a conversion scheme used by a bridge, such as bridge 1230 of FIG. 12, for converting high speed protocol to legacy (slow) SD protocol. The bridge scheme applied by storage device protocol converter (SDPC) 1300 facilitates communication of data/commands between a host device and an SD card by using SD-over-UFS transport layer. SDPC 1300, which shows SDPC 450 and SDPC 670 in more details, receives 1310 an SD command that is encapsulated within high speed protocol (e.g., UFS or UHS-II). The SD command is de-capsulated 1320 and held in registers 1330 and transferred 1340 to the SD card (the SD card is not shown in FIG. 13) by using SD transmission and link layer 1350 and SD physical layer 1360. Link layer signaling used for Command/DATA flow control (e.g., "Ready"/"Busy") are translated using link signaling translator 1385 from the high speed protocol link layer to the legacy SD protocol link layer. Any command-response, data and signaling sent from the storage device to the host device undergoes a similar process (i.e., command responses, data, etc. are loaded through the legacy SD protocol to the common set of registers 1330. The information is sent out in SD format through high speed memory interface 1310 by using link layer 1380 and physical layers 1390 of the high speed protocol. Link layer signaling is translated, by using link signaling translator 1385, directly to the high speed link layer signaling).

Figure 14:
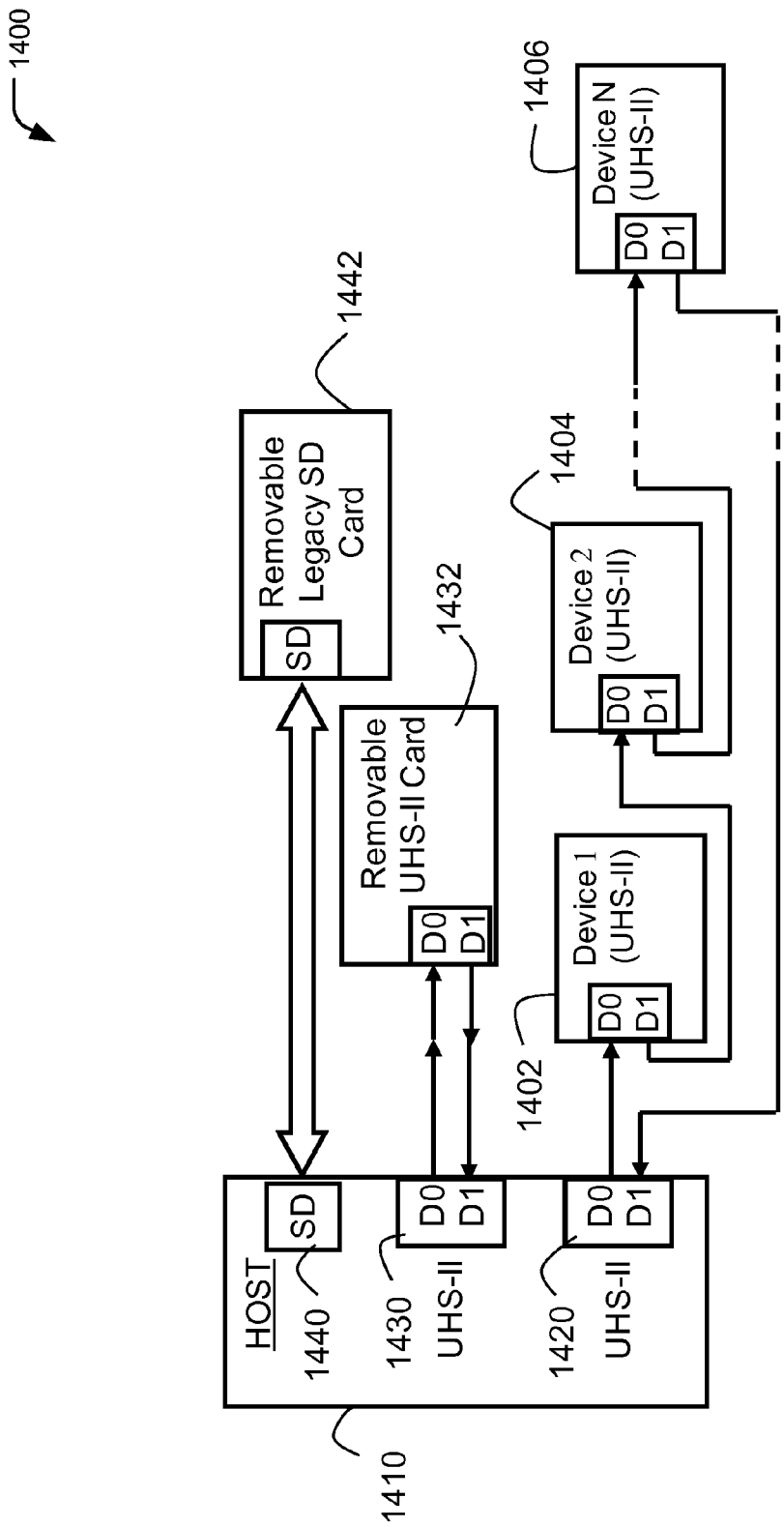
FIG. 14 shows a host device with a UHS-II interface for embedded storage devices connected in a Ring topology, a storage device interface for legacy SD cards, and a storage device interface for UHS-II cards.

FIG. 14 schematically illustrates a system that includes N embedded UHS-II cards/devices, designated as "Device 1" (shown at 1402), "Device 2" (shown at 1404), . . . , "Device N" (shown at 1406), which N devices are functionally connected to a host device 1410 via a ring topology, and a removable UHS-II storage device 1432 that is connected to device 1410 through UHS-II interface 1430, and a legacy SD removable card 1442 connected to host device 1410 through SD interface 1440. Host device 1410 has three types of interfaces: (1) a UHS-II interface 1420 for the N embedded devices "Device 1" through "Device N" that are connected through the ring topology, (2) a UHS-II interface 1430 for removable storage devices that support the UHS-II standard (e.g., UHS-II card 1432), and (3) a legacy SD interface 1440 for legacy SD card 1442. Removable UHS-II card 1432 can be functionally disconnected from host 1410 without affecting operation of the N embedded devices that are wired via the ring topology because of the separate communication paths. Nevertheless, a host device that includes three separate interfaces such as interfaces 1420, 1430, and 1440 is problematic because of the reasons explained above (i.e., extra input/output wiring, etc.).

Figure 15:
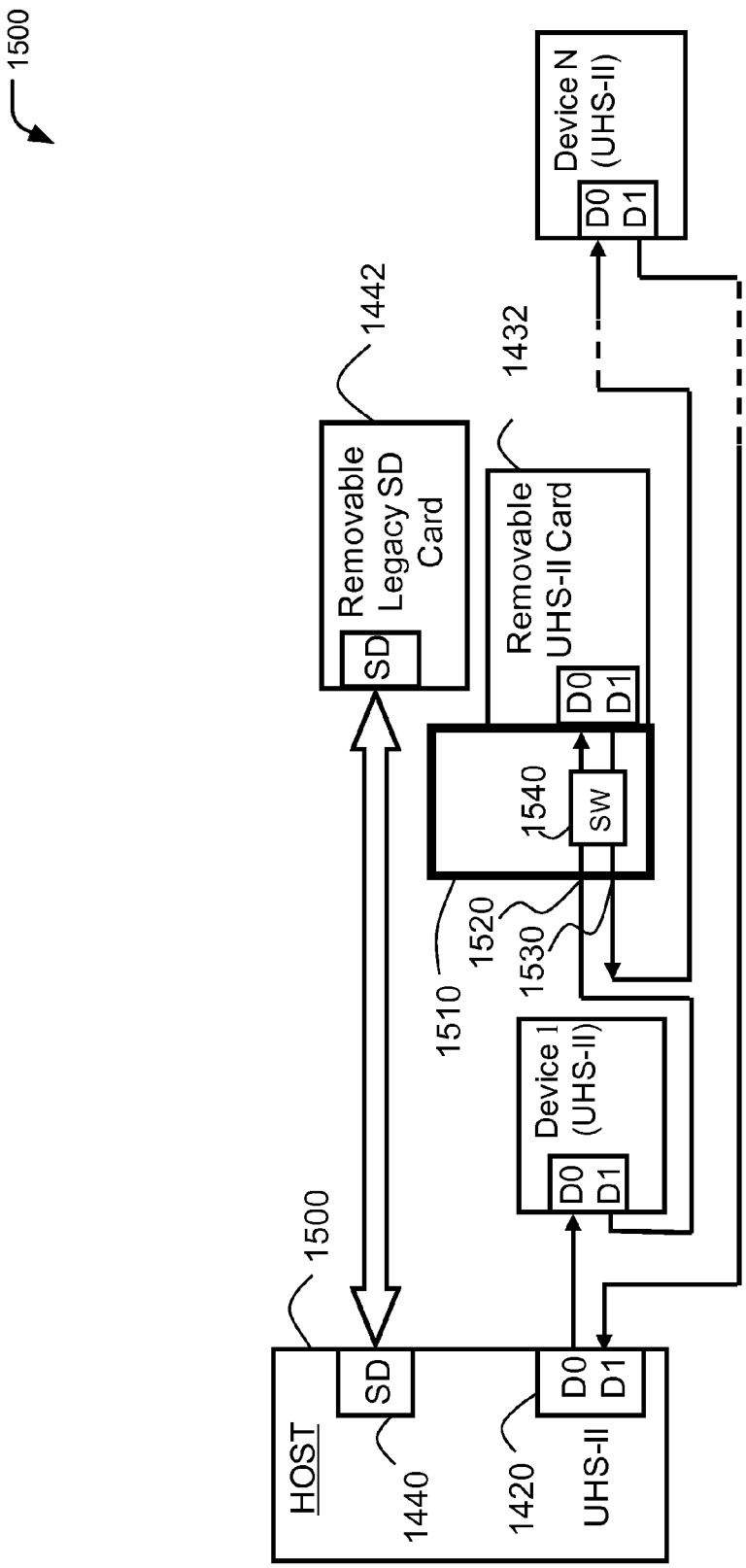
FIG. 15 shows a host device with one legacy SD interface, one UHS-II interface connected in a ring topology, and a bypass socket in a "non-bypass" state.
Figure 16:
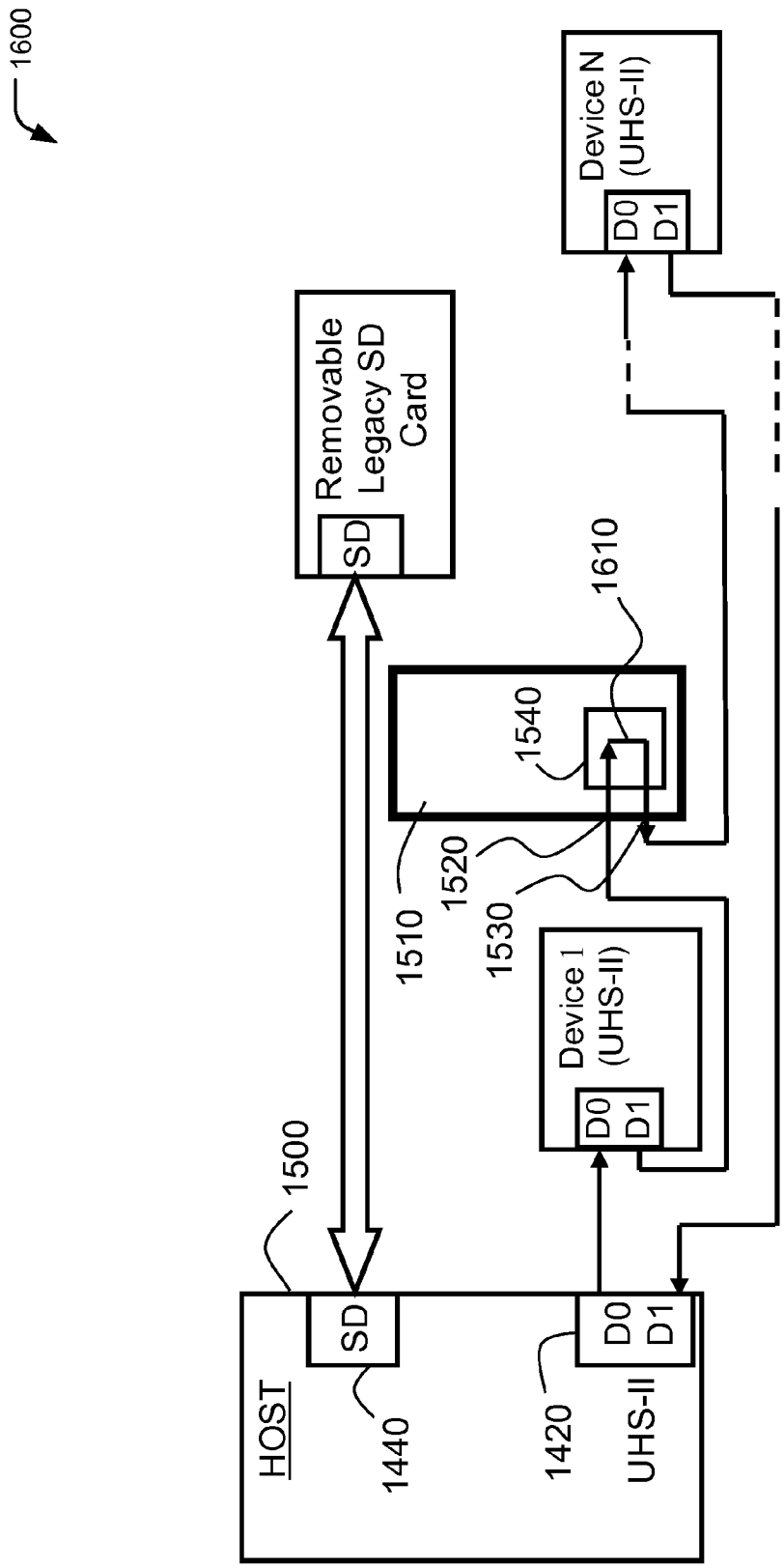
FIG. 16 shows the data storage system of FIG. 15 with the bypass socket in a "bypass" state.

FIG. 15 schematically illustrates a partial solution to the problem posed by the system scheme shown in FIG. 14. Removable UHS-II card 1432 is connected to the ring topology via a bridge 1510 that includes a bypass switch 1540). Bridge 1510 is provided with means for detecting whether removable UHS-II card 1432 is connected to it, and for connecting an input terminal 1520 of bridge 1510 to the "D0" terminal of removable UHS-II card 1432 and an output terminal 1530 of bridge 1510 to the "D1" terminal of removable UHS-II card 1432, and to internally connect input terminal 1520 to output terminal 1530 if removable UHS-II card 1432 is removed from bridge 1510, as shown in FIG. 16, which is described below. The network scheme of FIG. 15 saves one of the two UHS-II interfaces shown in FIG. 14 (i.e., UHS-II interface 1430). However, a separate SD interface (i.e., SD interface 1440) is still required in FIG. 15 in order to make host device 1500 an SD backward compatible device.

FIG. 16 shows the data storage system of FIG. 15 with removable UHS-II card 1432 disconnected from bridge 1510—card 1432 is shown connected to bridge 1510 in FIG. 15—and the consequent "bypass" state of bridge 1510. In the "bypass" state, input terminal 1520 of bridge 1510 is internally 1610 connected to output terminal 1530 of the bridge, thereby bypassing a storage device interface in bridge 1510 while removable UHS-II card 1432 is removed or disconnected from the storage device interface.

Figure 17:
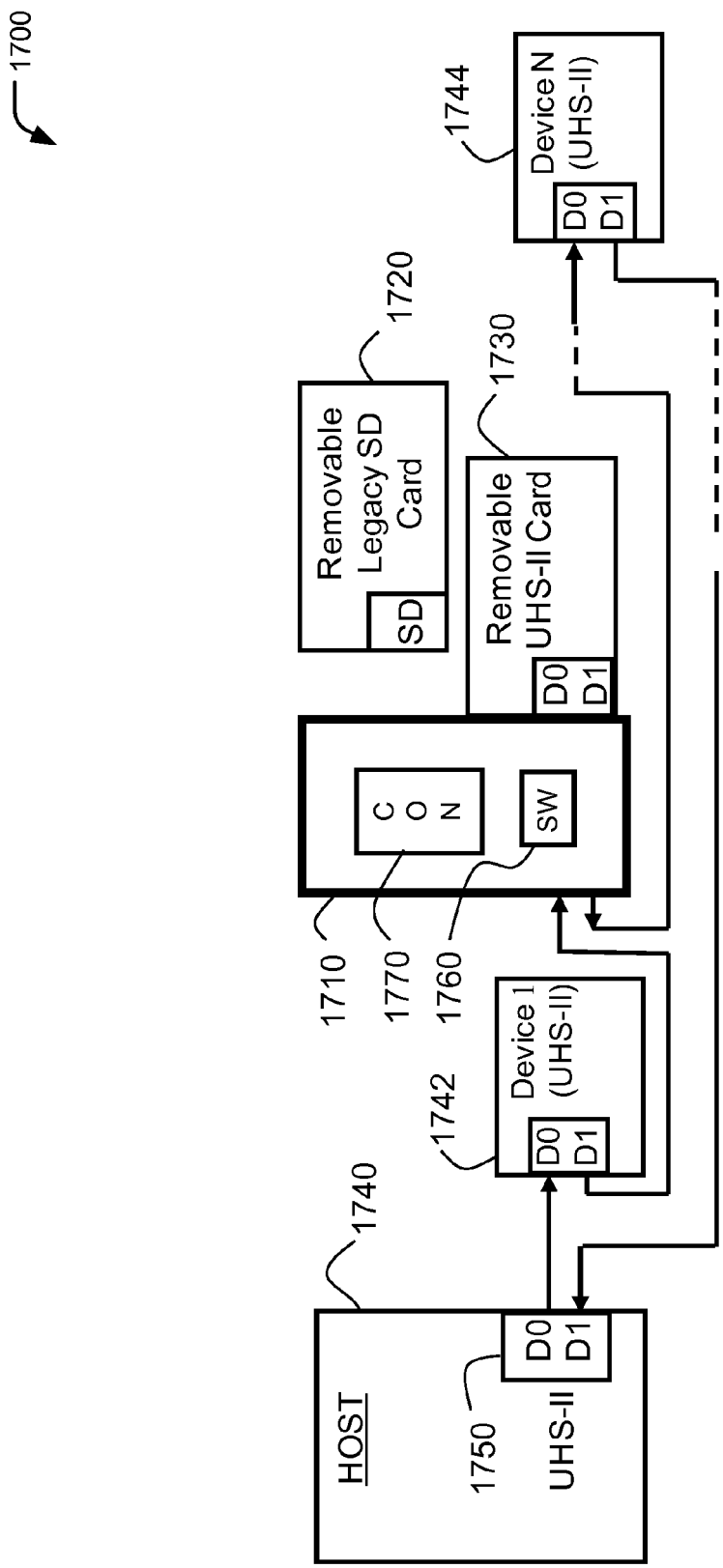
FIG. 17 shows a host device with one UHS-II interface and the bridge of FIG. 6 connected in a ring topology.

FIG. 17 shows a bridge 1710 that is connected in a ring topology according to an example embodiment. The ring topology includes a host 1740, N embedded devices (i.e., "Device 1", which is shown at 1742, through "Device N", which is shown at 1744, and bridge 1710, which corresponds to bridge 600 of FIG. 6. Bridge 1710 enables communication between removable legacy SD card 1720, or removable UHS-II card 1730, and host device 1740 even though host device 1740 has only one interface (i.e., UHS-II interface 1750). Host 1740 has only one storage device interface, which is shown at 1750, through which it communicates with each device in the ring topology by using the UHS-II protocol. If removable UHS-II card 1730 is connected to bridge 1710, switching system 1760 connects the card (i.e., card 1730) to the ring's loop without using SDPC 1770. If removable legacy SD card 1720 is connected to bridge 1710, switching system 1760 connects the card to the ring's loop through SDPC 1770 in order to enable conversion of the UHS-II protocol to the legacy SD protocol and vice versa. Switching system 1760 is similar to switching system 682 of FIG. 6, and SDPC 1770 is similar to SDPC 670 of FIG. 6.

Figure 18:
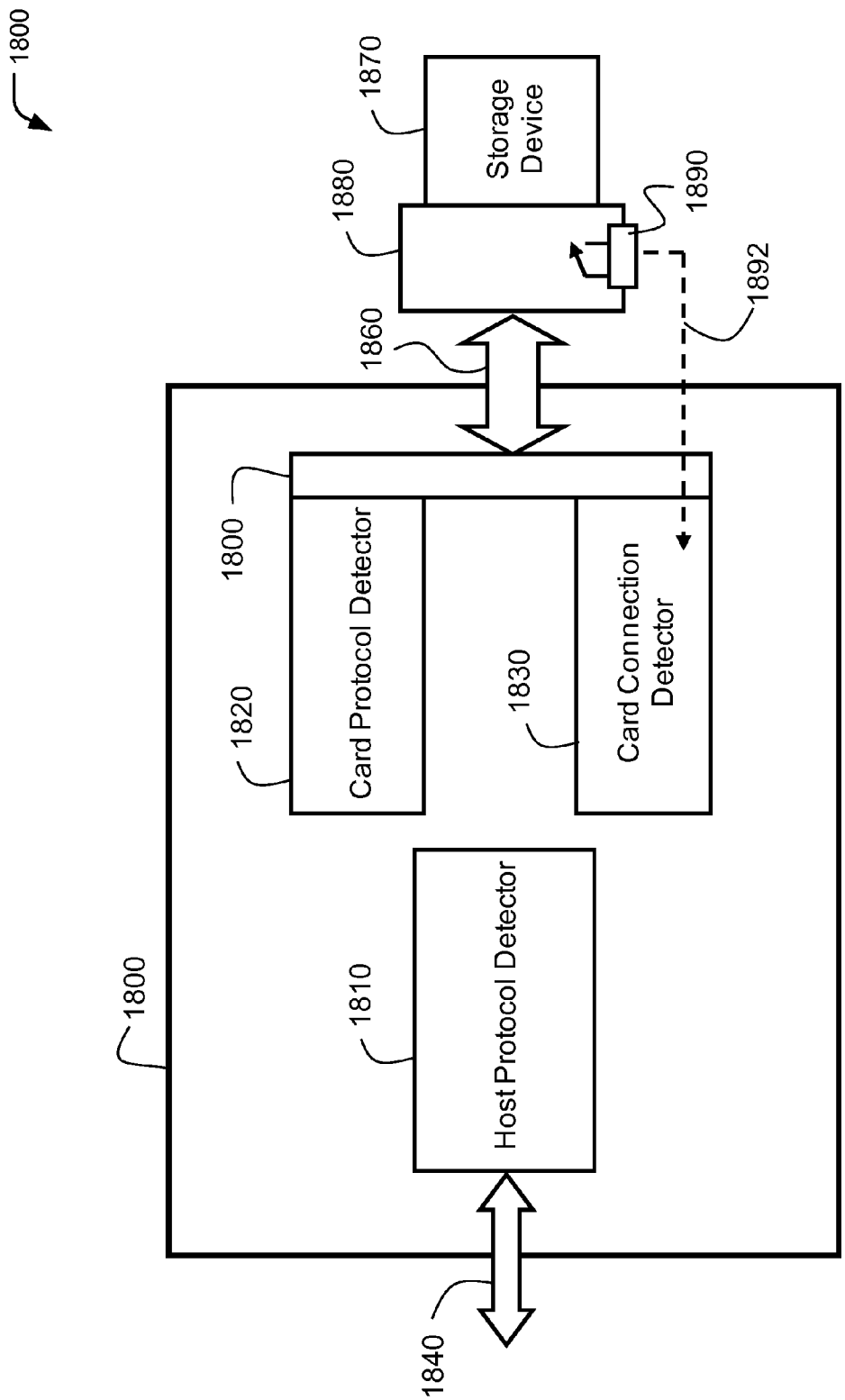
FIG. 18 shows a connection analyzer according to an embodiment.

FIG. 18 shows a connection analyzer 1800 according to an embodiment. Connection analyzer 1800 includes a host protocol detector 1810, a card protocol detector 1820 and a card insertion/removal detector 1830. As explained above, if the host device does not know in advance the type of the storage device protocol, the bridge may determine its type by monitoring communication with the host device. Accordingly, host protocol detector 1810 monitors communication signals that originate from a host device to detect the type of the storage device protocol that the host device uses. Connection analyzer 1800 may include a configurable interface 1840 to support one or more storage device protocols that a host device may use. In order to detect the type of protocol that a host device uses, host protocol detector 1810 initially configures interface 1840 to operate using a high speed protocol of a first type (e.g., UFS). Host protocol detector 1810 determines whether the initial interface configuration matches the storage device protocol that the host device uses based on communication signals that host protocol detector 1810 receives from the host device through interface 1840. If the initial interface configuration does not match the protocol used by the host device, host protocol detector 1810 configures interface 1840 to operate using a high speed protocol of a second type (e.g., UHS-II). It is assumed that one interface configuration matches one protocol that the host device uses. (Note: other fast storage device protocols than the UFS and/or UHS-II may be used by a host device.) In other words, host protocol detector 1810 determines the type of storage device protocol that a host device uses from the association between the operative configuration of interface 1840 and the corresponding protocol. Host protocol detector 1810 may alternatively determine the type of the protocol that the host device uses by using information or protocol command(s) that the host device transfers to the bridge by using an upper communication layer (e.g., link layer, transport layer, application layer).

Alternatively, host protocol detector 1810 may communicate with the host device by using one physical interface (e.g., interface 1840) that is suitable for one or more fast protocols. Assume that the host device communicates a protocol command to the bridge by using a particular fast protocol. Host protocol detector 1810 receives the protocol command, infers the type of the protocol that the host device uses from the protocol command, and uses the corresponding storage device protocol.

In one implementation, card protocol detector 1820 communicates with storage devices (e.g., storage device 1860) that use at least the slow storage device protocol (e.g., legacy SD protocol). In this implementation, card protocol detector 1820 initially communicates 1860 with storage device 1870 by using the slow storage device protocol in order to read configuration information from storage device 1870. The configuration information includes information regarding the type of storage device protocol(s) that the storage device can use. Based on the read configuration information, card protocol detector 1820 determines whether storage device 1870 can use the fast storage device protocol that the host device uses. If storage device 1870 does not use the fast storage device protocol that the host device uses, card protocol detector 1820 determines that storage device 1870 is to be accessed using the slow protocol. If storage device 1870 can use the fast storage device protocol that the host device uses, card protocol detector 1820 determines that storage device 1870 is to be accessed using the fast protocol.

In another implementation, card protocol detector 1820 initially communicates with storage devices (e.g., storage device 1860) by using the fast storage device protocol (e.g., UHS-II). In this implementation, card protocol detector 1820 initially communicates 1860 with storage device 1870 by using the fast storage device protocol. If storage device 1870 does not respond to the communication, card protocol detector 1820 determines that storage device 1870 is to be accessed using the slow protocol. If storage device 1870 responds to the communication, card protocol detector 1820 determines that storage device 1870 is to be accessed using the fast protocol.

In order to initiate the process of protocol detection there is a need to determine whether a storage device e is connected to the bridge. In another implementation, storage device 1870 is connected to the bridge via a socket 1880. As explained above in connection with the ring topology, if a device is removed from the ring's loop, it is imperative that the removed device be bypassed in order not to break the loop. To this end, socket 1880 may include a mechanical switch 1890 that is in a first state (e.g., "ON") when socket 1890 and storage device 1870 are physically and functionally engaged, and in a second state (e.g., "OFF") when storage device 1870 is removed from socket 1890. That being said, socket 1890 transfers a connection signal 1892 to card connection detector 1830, based on which card connection detector determines whether a storage device is connected to socket 1890 (i.e., to the bridge). Alternatively, card connection detector 1830 may use a polling scheme to poll storage device 1870. Polling sessions would be performed after the type of the protocol used by the storage device is determined. A determination that any protocol is used by a storage device is also used as an indication that a storage device is connected to the bridge. If an attempt to communicate with a presumably connected storage device fails, card protocol detector 1820 determines that a storage device is not connected to socket 1880.

Controllers 440, 540, and 660 can be a standard off-the-shelf System-on-Chip ("SoC") device or a System-in-Package ("SiP") device or general purpose processing unit with specialized firmware, software or application that, when executed by the controller, performs the configurations, steps, operations, determinations and evaluations described herein. Alternatively, the controller can be an Application-Specific Integrated Circuit ("ASIC") that implements the configurations, steps, operations, determination and evaluations described herein by using hardware.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. The present disclosure is relevant to various types of mass storage devices such as memory cards, SD-driven flash memory cards, flash storage devices, USB Flash Drives ("UFDs"), MultiMedia Card ("MMC"), Secure Digital ("SD"), miniSD, and microSD, and so on. Hence the scope of the claims that follow is not limited by the disclosure herein.

What is claimed is:

1. A method of communication between a host device and a storage device, the method comprising:
   in a bridge comprising a controller, a switching system, a bi-directional converter, a host interface configured to interface with a host device that uses a first storage device protocol, and a storage device interface configured to interface with a storage device that uses the first storage device protocol or that uses a second storage device protocol different from the first storage device protocol, the controller performing:
      determining, in response to the storage device being operatively connected to the bridge via the storage device interface, whether the storage device uses the first storage device protocol or whether the storage device uses the second storage device protocol;
      in response to the storage device using the second storage device protocol, configuring the switching system such that the bi-directional converter is functionally connected between the host interface and the storage device interface and converting communicated data from either of the first storage device protocol and the second storage device protocol to the other of the first storage device protocol and the second storage device protocol, and
      in response to the storage device using the first storage device protocol, configuring the switching system to bypass the bi-directional converter when connecting the host interface to the storage device interface,
   wherein one of the first storage device protocol and the second storage device protocol is a secure digital (SD) over universal flash storage (UFS) protocol.

2. The method of claim 1, wherein the controller is preprogrammed to recall that the host device uses the first storage device protocol.

3. The method of claim 1, wherein the controller further performs determining a type of storage device protocol used by the host device through interaction between the controller and the host device.

4. The method of claim 1, wherein the first storage device protocol facilitates faster data communication than the second storage device protocol.

5. The method of claim 1, wherein the first storage device protocol is one of a universal flash storage (UFS) protocol and an ultra high speed (UHS-II) protocol.

6. The method of claim 1, wherein the second storage device protocol is one of a secure digital (SD) protocol, a universal flash storage (UFS) protocol, and an ultra high speed (UHS-II) protocol.

7. The method of claim 1, wherein the storage device is one of secure digital (SD) card, universal flash storage (UFS) card, ultra high speed (UHS-II) card, SD-UFS card, and SD-UHS-II card.

8. The method of claim 1, wherein the bridge connects to a host device and to a storage device via a data network, wherein the data network has one of a chain topology and a ring topology.

9. The method of claim 1, wherein the bridge is connected directly to one of the host device and to a communication hub.

10. A storage system bridge, the storage system bridge comprising:
a host interface configured to interface with a host device that uses a first storage device protocol;
a storage device interface configured to interface with a storage device that uses the first storage device protocol or that uses a second storage device protocol different from the first storage device protocol;
a bi-directional converter configured to convert communicated data from either of the first storage device protocol to and the second storage device protocol to the other of the first storage device protocol and the second storage device protocol;
a controller; and
a switching system,
wherein, in response to the storage device being operatively coupled to the storage device interface, the controller is configured:
to determine whether the storage device uses the first storage device protocol or whether the storage device uses the second storage device protocol;
in response to the storage device using the second storage device protocol, to configure the switching system such that the bi-directional converter is functionally connected between the host interface and the storage device interface and converting the communicated data from either of the first storage device protocol and the second storage device protocol to the other of the first storage device protocol and the second storage device protocol, and
in response to the storage device using the first storage device protocol; to configure the switching system to bypass the bi-directional converter when connecting the host interface to the storage device interface,
wherein the storage system bridge connects to the host device and to the storage device via a bus, wherein the bus has one of a chain topology and a ring topology, wherein the switching system includes a bypass switch, and wherein the controller is further configured to detect a disconnection of the storage device from the storage device interface and in response to detecting the disconnection, to activate the bypass switch so as to bypass the storage device interface.

11. The storage system bridge of claim 10, wherein the controller is preprogrammed to recall that the host device uses the first storage device protocol.

12. The storage system bridge of claim 10, wherein the controller is further configured to determine a type of storage device protocol through interaction with the host device.

13. The storage system bridge of claim 10, wherein the first storage device protocol facilitates faster data communication than the second storage device protocol.

14. The storage system bridge of claim 10, wherein the first storage device protocol is one of a universal flash storage (UFS) protocol and an ultra high speed (UHS-II) protocol.

15. The storage system bridge of claim 10, wherein the second storage device protocol is one of a secure digital (SD) protocol, a universal flash storage (UFS) protocol, and an ultra high speed (UHS-II) protocol.

16. The storage system bridge of claim 10, wherein one of the first storage device protocol and the second storage device protocol is a small computer system interface (SCSI) over universal flash storage (UFS) protocol.

17. The storage system bridge of claim 10, wherein one of the first storage device protocol and the second storage device protocol is a secure digital over universal flash storage (SD-over-UFS) protocol.

18. The storage system bridge of claim 10, wherein the storage device is one of a secure digital (SD) memory card, a universal flash storage (UFS) memory card, an ultra high speed (UHS-II) memory card, an SD-UFS card, and an SD-UHS-II card.

19. The storage system bridge of claim 10, further comprising a connection analyzer configured to determine whether a storage device is interfaced with the storage system bridge and configured to determine a storage device protocol type that at least one of the host device and the storage device uses.

20. The storage system bridge of claim 10, wherein the storage system bridge is connected directly to one of the host device and to a communication hub.

21. A storage system bridge, comprising:
a host interface configured to interface with a host device that uses a first storage device protocol;
a storage device interface configured to interface with a storage device that uses one of a second storage device protocol and a third storage device protocol, wherein each of the second storage device protocol and the third storage device protocol differ from the first storage device protocol;
a first bi-directional converter configured to convert communicated data from either of the first storage device protocol and the second storage device protocol to the other of the first storage device protocol and the second storage device protocol;
a second bi-directional converter configured to convert the communicated data from either of the first storage device protocol and the third storage device protocol to the other of the first storage device protocol and the third storage device protocol;
a controller; and
a switching system that includes a bypass switch,
wherein, in response to the storage device being operatively connected to the storage device interface, the controller is configured:

to determine whether the storage device uses the second storage device protocol or whether the storage device uses the third storage device protocol;

in response to the storage device using the second storage device protocol, to configure the switching system such that the first bi-directional converter is functionally connected between the host interface and the storage device interface and converting the communicated data from either of the first storage device protocol to and the second storage device protocol to the other of the first storage device protocol and the second storage device protocol, and in response to the storage device using the third storage device protocol, to configure the switching system such that the second bi-directional converter is functionally connected between the host interface and the storage device interface and converting the communicated data from either of the first storage device protocol and the third storage device protocol to the other of the first storage device protocol and the third storage device protocol, and to detect a disconnection of the storage device from the storage device interface and to respond to the disconnection by activating the bypass switch so as to bypass the storage device interface.

22. The storage system bridge of claim 21, wherein the controller is preprogrammed to recall that the host device uses the first storage device protocol without interaction with the host device.

23. The storage system bridge of claim 21, wherein the controller is further configured to detect a type of storage device protocol through interaction with the host device.

24. The storage system bridge of claim 21, further comprising a connection analyzer configured to detect whether the storage device is interfaced with the storage system bridge, and configured to detect a storage device protocol type that at least one of the host device and the storage device uses.

25. A storage system bridge, comprising:
a host interface configured to interface with a host device via a bus having a ring topology, wherein the host interface uses a first storage device protocol;
a storage device interface configured to interface with a storage device via the bus having the ring topology, wherein the storage device interface uses the first storage device protocol or a second storage device protocol different from the first storage device protocol, wherein one of the first storage device protocol and the second storage device protocol is a secure digital (SD) over universal flash storage (UFS) protocol;
a controller; and
a configurable bypass switch,
wherein the controller is configured:
to determine whether a the storage device is operatively connected to the storage device interface;
in response to the storage device being operatively connected to the storage device interface, to connect the host device interface to the storage device interface, and
in response to the storage device not being connected to the storage device interface, to activate the configurable bypass switch so as to bypass the storage device interface.

26. The storage system bridge of claim 25, wherein the controller is further configured to detect whether the storage device is using the second storage device protocol or a third storage device protocol.

27. The storage system bridge of claim 26, further comprising a second bi-directional converter configured to convert the communicated data from either of the first storage device protocol and the third storage device protocol to the other of the first storage device protocol and the third storage device protocol, wherein the controller is configured to functionally connect the second bi-directional converter between the host interface and the storage device interface in response to detecting that the storage device uses the third storage device protocol.

28. The storage system bridge of claim 25, wherein the controller is further configured to detect whether the storage device is using the first storage device protocol or the second storage device protocol.

29. The storage system bridge of claim 25, wherein the first storage device protocol facilitates faster data communication than the second storage device protocol.

30. The storage system bridge of claim 25, wherein the controller is further configured to determine use of the first storage device protocol by the host device through interaction between the controller and the host device.

31. A storage system bridge, comprising:
a host interface;
a storage device interface;
a bi-directional converter configured to convert communicated data from either of a first storage device protocol and a second storage device protocol to the other of the first storage device protocol and the second storage device protocol, wherein one of the first storage device protocol and the second storage device protocol is a small computer system interface (SCSI over universal flash storage (UFS) protocol; and
a controller;
wherein, in response to a storage device being operatively coupled to the storage device interface while a host device that uses the first storage device protocol is operatively coupled to the host device interface, the controller is configured to functionally connect the bi-directional converter between the host interface and the storage device interface in response to detecting that the storage device uses the second storage device protocol.

32. The storage system bridge of claim 31, wherein the controller is further configured to detect whether the storage device is using the first storage device protocol or the second storage device protocol.

33. The storage system bridge of claim 31, wherein the controller is further configured to detect whether the storage device is using the second storage device protocol or a third storage device protocol.

34. The storage system bridge of claim 33, further comprising a second bi-directional converter configured to convert the communicated data from either of the first storage device protocol and the third storage device protocol to the other of the first storage device protocol and the third storage device protocol, wherein the controller is configured to functionally connect the second bi-directional converter between the host interface and the storage device interface in response to detecting that the storage device uses the third storage device protocol.

* * * * *

UNITED STATES PATENT AND TRADEMARK OFFICE
CERTIFICATE OF CORRECTION

PATENT NO. : 8,301,822 B2
APPLICATION NO. : 12/565685
DATED : October 30, 2012
INVENTOR(S) : Yosi Pinto et al.

Page 1 of 1

It is certified that error appears in the above-identified patent and that said Letters Patent is hereby corrected as shown below:

In the Claims section, Column 17, Claim 10, Line 38, "to and the second storage device protocol to the other of" should read --and the second storage device protocol to the other of--.

In the Claims section, Column 17, Claim 10, Line 59, "device protocol; to configure the switching system to" should read --device protocol, to configure the switching system to--.

In the Claims section, Column 19, Claim 21, Line 10, "protocol to and the second storage device protocol to the other" should read --protocol and the second storage device protocol to the other--.

In the Claims section, Column 19, Claim 25, Line 55, "to determine whether a the storage device is operatively connected" should read --to determine whether the storage device is operatively connected--.

In the Claims section, Column 20, Claim 31, Line 35, "a small computer system interface (SCSI over universal flash storage" should read --a small computer system interface (SCSI) over universal flash storage--.

Signed and Sealed this
Twenty-fifth Day of June, 2013

Teresa Stanek Rea
*Acting Director of the United States Patent and Trademark Office*